United States Patent
Wang et al.

(10) Patent No.: US 12,372,609 B2
(45) Date of Patent: Jul. 29, 2025

(54) FREQUENCY MODULATION CONTINUOUS WAVE (FMCW)-BASED SYSTEM FOR ESTIMATION AND COMPENSATION OF NONLINEARITY IN LINEARLY SWEPT SOURCES

(71) Applicant: Mitsubishi Electric Research Laboratories, Inc., Cambridge, MA (US)

(72) Inventors: Pu Wang, Cambridge, MA (US); David Millar, Concord, MA (US); Kieran Parsons, Rockport, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 821 days.

(21) Appl. No.: 17/400,630

(22) Filed: Aug. 12, 2021

(65) Prior Publication Data
US 2023/0050682 A1    Feb. 16, 2023

(51) Int. Cl.
*G01S 7/35* (2006.01)
*G01B 9/02* (2022.01)
(Continued)

(52) U.S. Cl.
CPC .......... *G01S 7/352* (2013.01); *G01B 9/02083* (2013.01); *G01B 9/02091* (2013.01);
(Continued)

(58) Field of Classification Search
CPC ...... G01S 7/352; G01S 7/4913; G01S 7/4091; G01S 7/497; G01S 13/343; G01S 13/345;
(Continued)

(56) References Cited

U.S. PATENT DOCUMENTS 7,737,885 B2 * 6/2010 Winkler ................ G01S 7/4008
342/100
7,986,397 B1 * 7/2011 Tiemann ................ G01S 17/32
356/5.09
(Continued)

FOREIGN PATENT DOCUMENTS

CN        103837870     6/2014
CN        106997047     9/2019
(Continued)

*Primary Examiner* — Eman A Alkafawi
*Assistant Examiner* — Joseph O Nyamogo
(74) *Attorney, Agent, or Firm* — Gene Vinokur

(57) ABSTRACT

A frequency modulation continuous wave (FMCW)-based system configured to convert measurements of a linearly modulated wave from a time-domain into a frequency-domain to produce a non-linear frequency signal, where the non-linear frequency signal comprises a known linear component representing the desired linear modulation and an unknown non-linear component representing the non-linearity of the modulation. The FMCW-based system is further configured to determine coefficients of a basis function approximating a difference between the non-linear frequency signal and the linear frequency component in the frequency domain. The FMCW-based system is further configured to detect one or multiple spectrum peaks in the distorted beat signal with the distortion compensated according to the basis function with the determined coefficients to determine one or multiple distances to the one or multiple objects in the scene.

18 Claims, 18 Drawing Sheets

(51) Int. Cl.
| | |
|---|---|
| *G01B 9/02091* | (2022.01) |
| *G01S 7/40* | (2006.01) |
| *G01S 7/4913* | (2020.01) |
| *G01S 7/497* | (2006.01) |
| *G01S 13/34* | (2006.01) |
| *G01S 17/34* | (2020.01) |

(52) U.S. Cl.
CPC .......... *G01S 7/4091* (2021.05); *G01S 7/4913* (2013.01); *G01S 7/497* (2013.01); *G01S 13/343* (2013.01); *G01S 13/345* (2013.01); *G01S 17/34* (2020.01)

(58) Field of Classification Search
CPC ....... G01S 17/34; G01S 7/40; G01B 9/02083; G01B 9/02091
See application file for complete search history.

(56) References Cited

U.S. PATENT DOCUMENTS

| | | | | |
|---|---|---|---|---|
| 2012/0256780 | A1* | 10/2012 | Shoji | G01S 13/582 342/107 |
| 2015/0287235 | A1* | 10/2015 | Rose | H01Q 21/00 345/424 |
| 2016/0142153 | A1* | 5/2016 | Zamani | H04B 10/613 398/202 |
| 2019/0178688 | A1* | 6/2019 | Jiang | G01D 5/35335 |
| 2019/0339359 | A1* | 11/2019 | Wang | G01S 13/343 |
| 2021/0341567 | A1* | 11/2021 | Laghezza | G01S 7/006 |

FOREIGN PATENT DOCUMENTS

| | | |
|---|---|---|
| CN | 111562564 | 8/2020 |
| CN | 112051583 | 12/2020 |
| KR | 101363140 | 2/2014 |

* cited by examiner

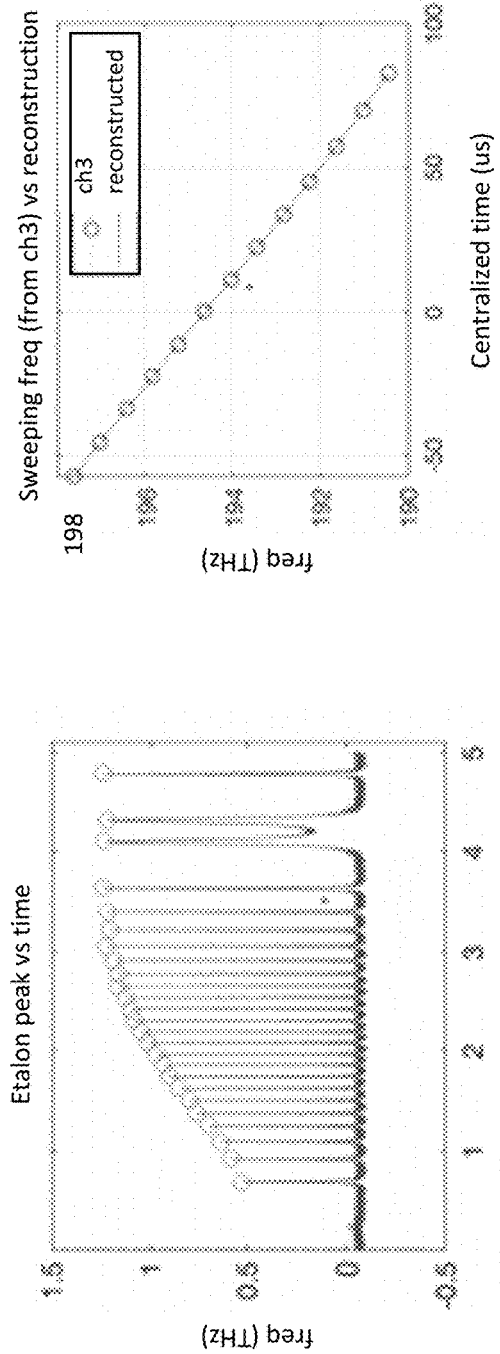
FIG. 10A
FIG. 10B
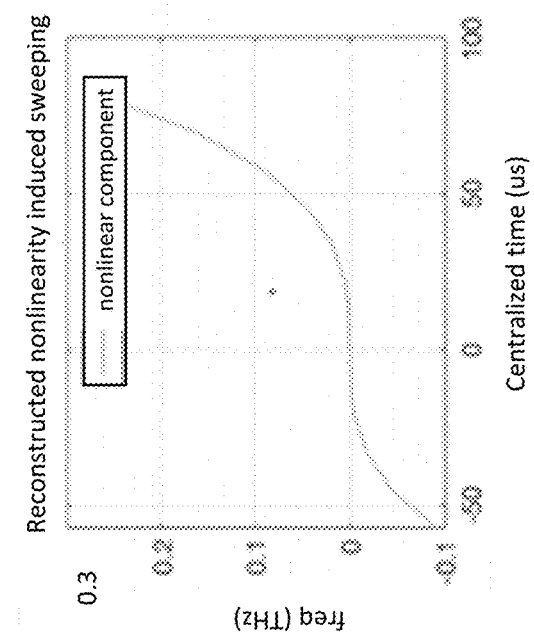
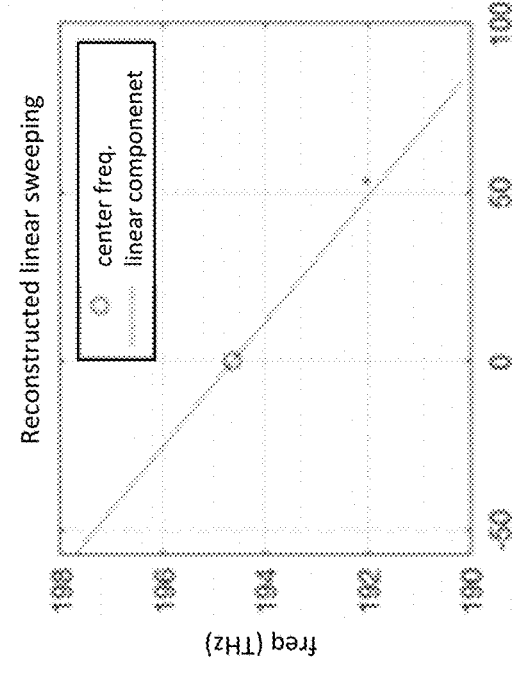
FIG. 10C
FIG. 10D

FREQUENCY MODULATION CONTINUOUS WAVE (FMCW)-BASED SYSTEM FOR ESTIMATION AND COMPENSATION OF NONLINEARITY IN LINEARLY SWEPT SOURCES

TECHNICAL FIELD

This disclosure generally relates to frequency modulation continuous wave (FMCW)-based systems, and particularly an FMCW-based system for estimation and compensation of non-linearity in linearly swept sources.

BACKGROUND

A linearly swept-source in sonic, radio, and optical frequency ranges have been used to estimate a range (e.g., distance) of reflectors with high resolution, low hardware cost, and lightweight signal processing. Frequency modulation continuous wave (FMCW) radar, optical frequency-domain reflectometry (OFDR), and swept-source optical coherence tomography (SS-OCT) are typical applications of linear swept sources. Combined with multiple sweeps, FMCW-based sensing systems can simultaneously estimate the range and (radial) velocity of reflectors. Besides the range and velocity estimates, azimuthal angular directions of reflectors can be estimated if an array of FMCW-based sensors is used.

For example, an FMCW radar transmits linearly frequency-modulated continuous waves, whose frequency pattern follows a saw tooth or triangular pattern with respect to time. Reflected signals from various objects of interest are mixed with the local oscillator signal, which is used to generate the transmitted signal, produce analog beat signals, and output digital beat signals via analog-to-digital converters (ADCs). Since the frequency of the beat signal is proportional to the distance of an object, a standard fast Fourier transform (FFT) of the beat signal can be used to identify peaks and estimate the distance. In the case of moving object(s), the frequency of the beat signal also depends on a radial velocity between the FMCW radar and the object. This velocity can be estimated by a second FFT across multiple linear FM scans.

An OFDR interferometer, similarly, provides beat signals that are produced by the optical interference between two light signals: one reference signal originates from a linearly chirped highly coherent light source and the other is from reflection or backscattering light from an optical path of a fiber under test. The resulting interference signal is collected as a function of the optical frequency of a tunable laser source (TLS). An FFT is then used to convert this frequency domain information to spatial information.

Similarly, SS-OCT employs linearly frequency-swept laser to provide high accuracy range solution measurements for imaging applications. With a tunable laser source that scans through a wide range of frequencies with fast sweeping speed and narrow instantaneous linewidth, SS-OCT acquires all range information in a single axial scan from the frequency spectrum of the interference signal between reflected light signal and a stationary reference signal.

One common issue related to all three applications is that the range resolution degrades when the swept source is not completely linearly modulated. The source nonlinearity can be due to nonlinear tuning and phase noise of the laser source, impairments of a low-cost voltage-controlled oscillator (VCO), and temperature sensitivity of the laser source. The non-linearity results in spectrum spreading of beat signals and, hence, deteriorates the spatial resolution and sensitivity. The nonlinearity effect is also range-dependent: smaller at short measurement distances and greater at long measurement distances.

State-of-art computational methods use a known reference branch to achieve nonlinearity correction. Specifically, the unknown non-linearity of the modulated source causes the unknown shift in the range estimation, making the entire estimation system underdetermined. To that end, some systems use a dedicated path of a known distance to eliminate at least one unknown from the range estimation and to estimate the nonlinearity of the modulation. However, using the dedicated path requires additional hardware resources, which is undesirable for some applications and increases the overall cost of a system.

SUMMARY

Accordingly, it is an objective of the present disclosure to implement a cos-effective FMCW-based system configured to estimate and overcome non-linearity in linearly swept sources.

Some embodiments are based on a recognition that one of the reasons for the need for a reference arm is due to the sampling of high-frequency signals. The FMCW-based systems explore frequency modulations and spectrum measurements at high frequencies. However, sampling a signal at such high frequencies is very expensive.

To that end, various FMCW-based systems use beat signals with lower frequencies for the measurements. For example, a measurement arm of the FMCW-based systems mixes the transmitted signal with the reflection to generate the beat signal. Similarly, the reference arms mixes its delayed copy with a known delay to produce another beat signal for nonlinearity compensation. The hardware components for generating the beat signal need precise manufacturing and assembling, and, hence, are relatively expensive.

Some embodiments are based on the realization that for compensation of the non-linearity of source modulated signals, it is desired to measure the modulated signal itself, and not the beat signal after mixing the modulated signal and a known delay copy. Such measurement would avoid building a dedicated reference arm and would require just an arrangement of the sensor on the path of the modulated signal. However, the cost of building a dedicated path with a known delay, the mixer, and sampling the high frequency modulated signal makes this approach impractical.

Some embodiments are based on the realization that due to the modulation of the transmitted signal in the FMCW-based systems, at different instances of time the modulated signal has different frequencies. Hence, if a frequency filter that passes only specific frequencies is placed on a path of the modulated signal the outputs of the frequency filter can be seen as analogous to sampling. These outputs, however, would be very sparse and typically not suitable for non-linearity compensation.

For example, an etalon is a device having two reflecting glass plates, usually employed for measuring small differences in the wavelength of light using the interference it produces. However, the etalon can act as a frequency filter, in which the refractive index of the etalon and the distance between the plates governs the passing wavelengths. Advantageously, the etalon is inexpensive, i.e., cheaper to manufacture than the reference arm. However, the sampling property of the frequency filter such as etalon is sparse. As used herein, sparse sampling is sampling with a sampling frequency at least 1000 times less than the modulated frequency of the transmitted wave in the frequency domain. For example, if the sampling frequency for the reference arm is 900 MHz, while the etalon peaks of passing wavelength are reported every 12.5 us which corresponds to a sampling frequency of only 80 kHz.

To that end, there is a need for a system and method to use sparse sampled linearly modulated signal for non-linearity compensation. Some embodiments are based on the realization that if the signal sparsely sampled in the time domain is transformed into the frequency domain, that transformed non-linear frequency signal would have a known linear component representing the desired linear modulation and the unknown non-linear component representing the undesired non-linearity of the modulation. Hence, the undesired non-linearity of modulation can be recovered based on a difference between the non-linear frequency signal and a linear frequency signal corresponding to the linear modulation in the frequency domain.

Such a recovery is a computationally expensive ill-posed problem. However, some embodiments are based on the realization that the recovery can be simplified when the unknown non-linear frequency signal is approximated with unknown coefficients of a known basis function. In such a formulation, the non-linearity of modulation is defined by the coefficients of a basis function approximating a difference between the non-linear frequency signal and a linear frequency signal corresponding to the linear modulation in the frequency domain. For example, the coefficients of the basis function can be determined by solving a least square problem to minimize the difference.

Moreover, some embodiments are based on realization proved by the experiments, that when the estimation of non-linearity in the frequency domain is formulated as a computational estimation of a frequency signal transformed from the samples in the time domain, the reduction of the rate of the sampling in the time domain has little effect on the accuracy of estimation of the of non-linearity. Such an understanding allows some embodiments to further simplify the hardware requirements for the FMCW-based system. For example, in some embodiments, the sampling in the time domain is sparse, e.g., 1000 times less than the modulated frequency of the transmitted wave in the frequency domain, thereby reducing the cost of the time-domain sensor.

Some embodiments use optical filters that can be placed directly on the path of the modulated signal. For example, in one embodiment, the optical filter includes an etalon producing an etalon signal, such that the samples in the time domain are peaks of the etalon signal at the different time instances making the samples in the time domain sparse. Specifically, the etalon can be seen as an optical interferometer that includes two refractive plates or mirrors separated by a small, fixed distance. The refractive index of the etalon and the distance between the plates governs the passing wavelengths.

In an etalon, the refractive index of the medium between two mirrors increases as the incident optical field increases in intensity, resulting in a shift in the transmission peaks of the etalon to other wavelengths and, thus, frequency sweeping. Hence, the peaks of the etalon signal can be sampled in the time domain to result in a sparse signal that is sparsely sampled for different time instances. However, even such a sparsely sampled signal is sufficient for the compensation of the non-linearity of the modulation according to the principles of some embodiments.

Accordingly, one embodiment discloses a frequency modulation continuous wave-based system, comprising: an emitter configured to transmit at least one wave of radiation to a scene, where the transmitted wave is linearly modulated in a frequency domain, and where the linear modulation is subject to impairments causing a non-linearity of the transmitted wave in the frequency domain. The FMCW-based system further comprises a receiver configured to receive a reflection of the transmitted wave from one or multiple objects in the scene; a mixer operatively connected to the emitter and the receiver and configured to interfere a copy of the wave transmitted by the emitter with the reflection of the transmitted wave received by the receiver to generate a beat signal with spectrum peaks corresponding to reflections from the one or multiple objects in the scene, wherein the beat signal is distorted due to the non-linearity of the modulation caused by the impairments; an analog-to-digital converter (ADC) operatively connected to the mixer and configured to generate samples of the distorted beat signal; and a frequency filter configured to pass signals at predetermined frequencies, the frequency filter is operatively connected to the emitter passing the linearly modulated waveform transmitted by the emitter at different time instances at the predetermined frequencies to generate measurements of the modulated waveform in a time-domain. The FMCW-based system further comprises at least one processor configured to convert the measurements of the linearly modulated wave from the time-domain into a frequency-domain to produce a non-linear frequency signal, wherein the non-linear frequency signal comprises a known linear component representing the desired linear modulation and an unknown non-linear component representing the non-linearity of the modulation; determine coefficients of a basis function approximating a difference between the non-linear frequency signal and the linear frequency component in the frequency domain; and detect one or multiple spectrum peaks in the distorted beat signal with the distortion compensated according to the basis function with the determined coefficients to determine one or multiple distances to the one or multiple objects in the scene.

Accordingly, another embodiment discloses a method, comprising transmitting, by an emitter, at least one wave of radiation to a scene, where the transmitted wave is linearly modulated in a frequency domain, and where the linear modulation is subject to impairments causing a non-linearity of the transmitted wave in the frequency domain; receiving, by a receiver, a reflection of the transmitted wave from one or multiple objects in the scene; interfering, by a mixer, a copy of the transmitted wave with the received reflection of the transmitted wave to generate a beat signal with spectrum peaks corresponding to reflections from the one or multiple objects in the scene, where the beat signal is distorted due to the non-linearity of the modulation caused by the impairments; generating, by an analog-to-digital converter (ADC), samples of the distorted beat signal; and passing, by a frequency filter, signals at predetermined frequencies, where the frequency filter is operatively connected to the emitter passing the linearly modulated wave transmitted by the emitter at different time instances at the predetermined frequencies to generate measurements of the modulated wave in a time-domain. The method further comprises converting the measurements of the linearly modulated wave from the time-domain into a frequency-domain to produce a non-linear frequency signal, where the non-linear frequency signal comprises a known linear component representing the desired linear modulation and an unknown non-linear component representing the non-linearity of the modulation; determining coefficients of a basis function approximating a difference between the non-linear frequency signal and the linear frequency component in the frequency domain; and detecting one or multiple spectrum peaks in the distorted beat signal with the distortion compensated according to the basis function with the determined coefficients to determine one or multiple distances to the one or multiple objects in the scene.

BRIEF DESCRIPTION OF THE DRAWINGS

FIG. 10A shows an exemplary etalon signal generated by the optical etalon, according to an example embodiment.

FIG. 10B shows non-linear frequency swept, according to an example embodiment.

FIG. 10C shows a linear component of a non-linear swept frequency, according to an example embodiment.

FIG. 10D shows a non-linear component of the non-linear swept frequency, according to an example embodiment.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
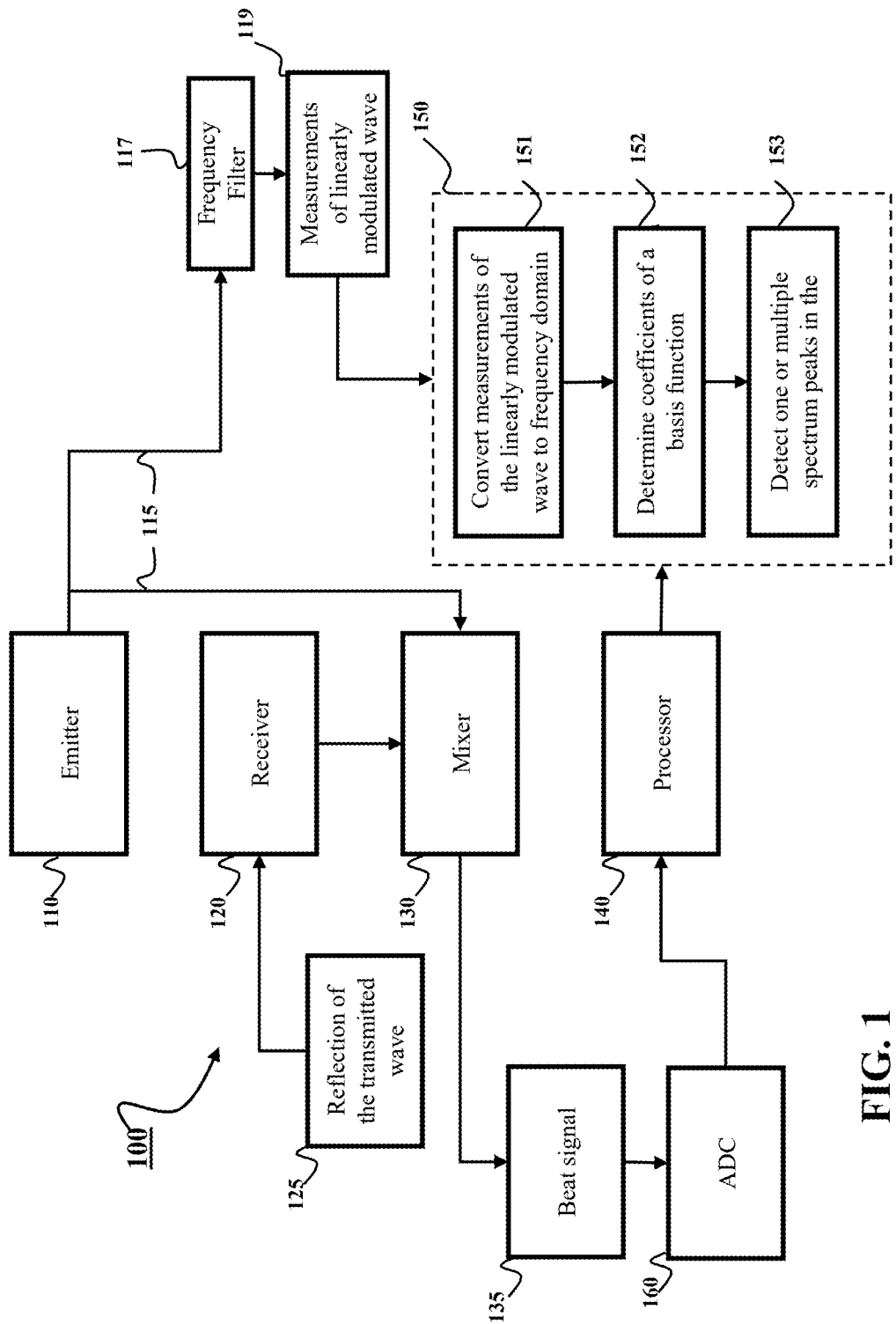
FIG. 1 illustrates a block diagram of a frequency modulation continuous wave (FMCW)-based system, according to an example embodiment.

FIG. 1 illustrates a block diagram of a frequency modulation continuous wave (FMCW)-based system 100, according to an example embodiment. The FMCW-based system 100 (hereinafter also referred as "a system 100") includes at least one emitter 110 configured to transmit at least one linearly modulated wave 115 of radiation (hereinafter also referred to as "a modulated signal 115") to a scene. In various implementations, the emitter 110 includes a linear modulator to linearly modulate a waveform in a frequency domain. For example, the emitter 110 may include a source component generating the FMCW waveforms, a power amplifier, and antennas configured to send the FMCW waveforms to the media. The modulation of the FMCW waveforms is subject to impairments causing a non-linearity of the modulation of the transmitted FMCW wave in the frequency domain. For example, the non-linearity of the modulation can be caused by the aging of the hardware and/or surrounding temperature that varies over time.

The system 100 further includes at least one receiver 120 to receive a reflection of a transmitted wave from one or multiple objects/reflectors located at different locations in the scene. The system 100 also includes a mixer 130 operatively connected to the emitter 110 and the receiver 120 to interfere (or to beat) a copy of the linearly modulated wave 115 outputted by the emitter 110 with the reflection 125 of the transmitted wave received by the receiver 120 to produce a beat signal 135. For example, the receiver 120 may include receiving antennas, a low noise amplifier (LNA), and the mixer 130 that multiplies the received waveform (i.e., the reflection 125 of the transmitted wave) with the source FMCW waveform (i.e., the linearly modulated wave 115).

Beating, performed by the mixer 130, comprises determining a difference between two frequencies i.e., a frequency of the copy of the modulated wave 115 and a frequency of the reflection 125 of the transmitted wave. The beating produces the beat signal 135 that is oscillated with a beat frequency, where the beat frequency corresponds to the difference between the two frequencies. Thus, the beat signal 135 is at a considerably lower frequency than the linearly modulate wave 115 and the reflection 125 of the transmitted wave. Due to the beating of the copy of the linearly modulated wave 115 and the reflection 125 of the transmitted wave, the beat signal 135 includes spectrum peaks corresponding to reflections from the different locations at the scene. However, the beat signal 135 is distorted due to the non-linearity of the modulation. This distortion can include or cause one or a combination of spread and shift of the spectrum peaks of the beat signal 135, which reduces the accuracy of the range estimation.

To analyze the beat signal 135, the system 100 uses a processor 140. To that end, the beat signal 135 is sampled by an analog-to-digital converter (ADC) 160. The ADC 160 is operatively connected to the mixer 130. As the beat signal 135 is of lower frequency, the ADC 160 can easily sample the beat signal 135. However, the sampled beat signal 135 is distorted due to the non-linearities.

Some embodiments are based on the recognition that the distortion of the beat signal 135 depends not only on the type of non-linearity but also on the distance to the objects reflecting the linearly modulated signal 115. In such a manner, the distorted beat signal depends on two types of unknowns such as non-linearity of modulation and the distances to the reflecting objects. For example, different non-linearity of the modulation can cause different spreads and shifts of the peaks of the beat signal 135, where the peaks of the beat signal 135 may be caused by the reflection of the linearly modulated signal 115 from the same object. However, different non-linearity of the modulation can cause the same spreads and shifts of the peaks of the beat signal 135, where the peaks of the beat signal 135 may be caused by the reflection of the modulated signal 115 from the objects at different distances from the source of non-linearity. Accordingly, the representation of the distorted beat signal 135 is ill-posed, i.e., underdetermined, because different combinations of values of the non-linearity and the distance to the object can result in the same distorted beat signal 135.

However, some embodiments are based on the realization that a representation of the distorted beat signal 135 having multiple peaks corresponding to multiple reflections of the linearly modulated signal 115 transforms the ill-posed problem into a well-posed, i.e., determined, problem, because only one non-linear function can cause a specific multi-peak distortion. Specifically, this realization is based on understanding that reflection of the linearly modulated signal 115 from a location at the scene carries the information on both the non-linearity of modulation and the reflector-dependent range/delay parameter indicative of the distance to the location. With multiple reflections M, the beat signal 135 is the sum of M responses characterized by M delay parameters and a common source of the non-linearity of modulation.

Some embodiments are based on the realization that the linearly modulated signal 115 sampled at a specific frequency may be used to estimate the source causing non-linearity in the modulation of the linearly modulated signal 115, where the non-linearity in the linearly modulated signal 115 is resulting in the distortion in the beat signal 135 at the output of the mixer 130. However, the linearly modulated signal 115 is a high-frequency signal (of the order of Gigahertz GHz). Sampling of such high-frequency signals using, for example, the ADC 160, may be very expensive for some applications.

Some embodiments are based on the realization that a low-cost passive filter (or optical filter) may be used as a frequency filter 117 to sample the high frequency linearly modulated signal 115. Further, the sampled signal may be used to obtain measurements 119 of the linearly modulated signal 115. However, frequency-filter 117 may sample the linearly modulated signal 115 at a very low frequency, approximately, at a frequency at least 1000 times lesser than a sampling frequency of the ADC 160. Therefore, the sampled signal comprises samples in the time domain, where the samples are peaks of the sampled signal at the different time instances making the samples in the time domain sparse. Thus, the sampled signal at the output of the frequency filter 117 comprises very less samples or is a sparsely sampled signal.

Some embodiments are based on the realization that the sparsely sampled signal may be used to estimate the source non-linearity. In the present disclosure, estimating the source non-linearity is solved as an optimization problem, where a difference between the sampled modulated signal obtained from the frequency filter 117 and the sum of the ideal linearly modulated signal and a source nonlinearity function is minimized to accurately estimate the source non-linearity. Further, based on the estimated source of non-linearity, the corresponding non-linearity may be compensated in the beat signal 135. The compensated beat signal 135 may then be used to correctly determine distances to multiple objects in the scene.

To that end, the processor 140 may resolve 150 the source of non-linearity for determining the distances to the multiple objects in the scene. The processor 140 is connected to memory 170, where the memory 170 is configured to store data to estimate the range information of multiple reflectors (or the objects) in the scene. The processor 140 may digitally sample and process the data to estimate the range information of multiple reflectors in the scene. Further, an output interface may be used to render the position of the multiple reflectors. In some embodiments, the processor 140 may further estimate speed information of the multiple reflectors in the scene.

Specifically, the processor 140 may be configured to convert 151 the measurement 119 of the linearly modulated signal 115 (or the sparsely sampled signal) from the time domain to the frequency domain to produce a non-linear frequency signal. The transformed (or converted) non-linear frequency signal comprises a known linear component representing the desired linear modulation and the unknown non-linear component representing the undesired non-linearity of the modulation or the source of non-linearity. The undesired non-linearity of modulation may be recovered based on a difference between the non-linear frequency signal and the linear frequency signal (or the linear frequency component) corresponding to the linear modulation in the frequency domain.

To reduce the complexity of calculating the source of non-linearity, the processor 140 may be further configured to determine 152 coefficients of a basis function that approximates the difference between the non-linear frequency signal and the linear frequency signal corresponding to the linear modulation in the frequency domain. In this way, the source of non-linearity may be estimated. Further, the estimated non-linearity may be used to compensate for the distorted beat signal. The processor 140 may be further configured to detect 153 one or multiple spectrum peaks in the distorted beat signal, where the distortion is compensated according to the basis function with the determined coefficients to determine the one or multiple distances to the one or multiple objects in the scene.

In some embodiments, the frequency-filter 117 may comprises an optical etalon, where the optical etalon is a monolithic interferometric device containing two parallel reflecting surfaces. The optical etalon (also called as a Fabry-Perot etalon) comprises two mirrors with air gap in between (an air-spaced etalon). When the optical etalon is inserted into a laser beam, the optical etalon acts as an optical resonator (or cavity). In the optical resonator, the transmissivity varies approximately periodically with the optical frequency. At resonance, the reflections from the two surfaces cancel each other via destructive interference. The highest reflection losses and thus the lowest transmissivity occur in anti-resonance. The reflectivity of each of the surfaces of the optical etalon may simply result from the refractive index discontinuity between a material of the optical etalon and air (Fresnel reflection) or may be modified with dielectric coatings. By increasing the reflectivity, it is possible to sharpen the resonances without reducing a free spectral range. Thus, the optical etalon is an adjustable optical filter that may be tuned to pass (at the resonance) a specific frequency and reflect (or reject) (at the anti-resonance) other frequencies. An example of the optical etalon (the Fabry-Perot etalon) of the FMCW based system 100, is described below with respect to FIG. 2.

Figure 2:
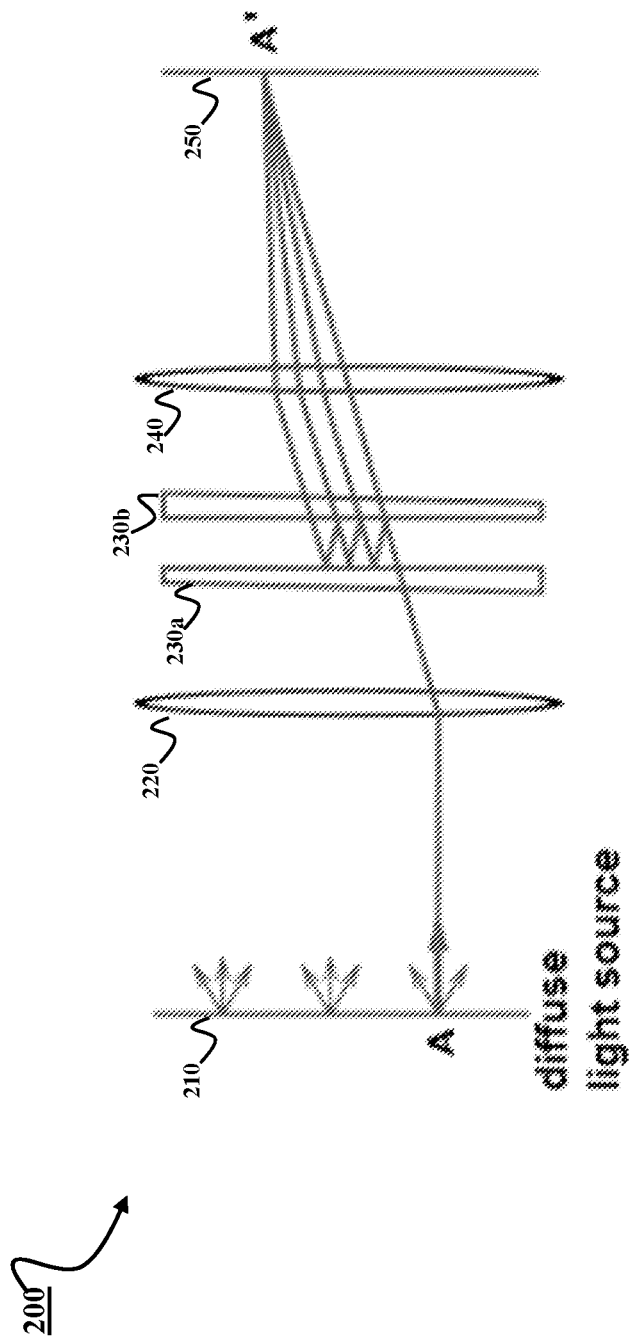
FIG. 2 illustrates an optical etalon of the FMCW based system, according to an example embodiment.

FIG. 2 illustrates a Fabry-Perot etalon 200 of the FMCW based system 100, according to an example embodiment. The Fabry-Perot etalon 200 comprises a diffuse light source 210, a collimating lens 220, a cavity 230, where the cavity 230 comprises a pair of partially reflective and slightly wedged optical flats 231 and 232. The Fabry-Perot etalon 200 further comprises a focusing lens 240 and a screen 250. The main component of the Fabry-Perot etalon 200 is the cavity 230 comprising the pair of partially reflective glass optical flats 231, 232 (also referred as the pair of flats) spaced micrometers to centimeters apart, with the reflective surfaces facing each other. Alternatively, the Fabry-Perot etalon 200 may use a single plate with two parallel reflecting surfaces. The pair of flats 231-232 forms a reflective cavity. The flats 231, 232 in an interferometer are often made in a wedge shape to prevent the rear surfaces from producing interference fringes. The rear surfaces often also have an anti-reflective coating.

The Fabry-Perot etalon 200 uses a phenomenon of multiple beam interference that arises when light from the diffused light source 210 is radiated through the cavity 230 bounded by two reflective parallel surfaces (i.e., the pair of flats 231-232). Each time the light encounters one of the surfaces, a portion of the light is transmitted out, and the remaining part is reflected. The net effect is to break a single beam of light into multiple beams of light which interfere with each other. If the additional optical path length of the reflected beam (due to multiple reflections) is an integral multiple of wavelength the light, the reflected beams will interfere constructively. In other words, more is the number of reflections inside the cavity 230, sharper is the interference maximum.

Further, the diffuse light source 210 is set at the focal plane of the collimating lens 220. The diffuse light source 210 is used to provide illumination. Light emitted from a point on the source (point A) is focused to a single point in an image plane. In FIG. 2, for ease of explanation, only one ray emitted from the point A on the source is traced. As the ray passes through the pair of flats 231-232, it is reflected multiple times to produce multiple transmitted rays which may be collected by the focusing lens 240 and brought to point A' on the screen 250. The focusing lens 240 may produce an inverted image of the source if the pair of flats 231-232 are not present. The complete interference pattern may take an appearance of a set of concentric rings, where sharpness of the rings depends on the reflectivity of the pair of flats 231-232.

In the Fabry-Perot etalon 200, a refractive index of the medium between the flats 231-232 (in this case, air) increases as the incident optical field (i.e., the light) increases in intensity. As a result, an etalon signal is produced such that a shift is introduced in the transmission peaks of the etalon signal to other wavelengths. The shift in the transmission peaks of the etalon signal causes frequency sweeping. Hence, the peaks of the etalon signal can be sampled in the time domain that results in a sparse signal that is sparsely sampled for different time instances. The optical filter such as the Fabry-Perot etalon 200 as described above can be used as the frequency filter 117 to sample the high frequency modulated signal 115.

In an example embodiment, for sampling the high frequency modulated signal 115, the frequency filter 117 may be replaced by at least one of the Michelson interferometers, the Twyman-Green interferometer, the laser unequal path interferometer (LUPI), or the step phase interferometer.

Further, a method for estimating the source of non-linearity and then compensating the beat signal 135 based on the estimated source of non-linearity is explained with reference to FIG. 3 below.

Figure 3A:
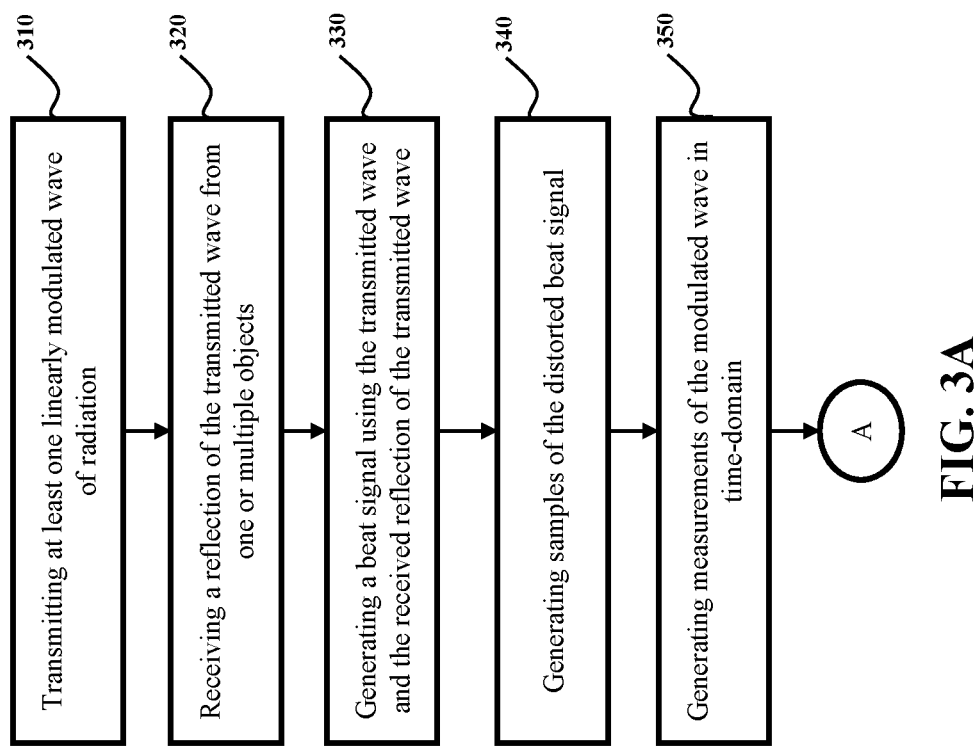
FIGS. 3A and 3B, collectively, illustrate a method for compensating non-linearity in linear swept sources by the optical etalon the FMCW based system, according to an example embodiment.
Figure 3B:
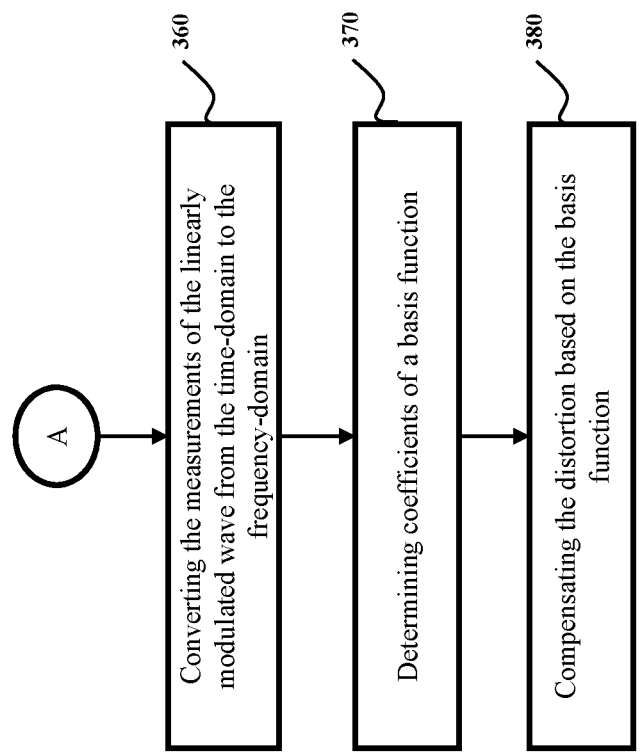

FIG. 3A and FIG. 3B, collectively, illustrate a method 300 for compensating non-linearity in linear swept sources the optical etalon (the Fabry-Perot etalon 200) of the FMCW based system 100, according to an example embodiment. FIG. 3A and FIG. 3B are described in conjunction with FIG. 1 and FIG. 2.

At step 310, at least one linearly modulated wave of radiation 115 (or modulated wave) may be transmitted to a scene by using the emitter 110 where the linear modulation is subject to impairments causing a non-linearity of the transmitted wave in the frequency domain.

At step 320, reflections of the transmitted wave from one or multiple objects in the scene may be received by the receiver 120.

At step 330, a copy of the transmitted wave may be interfered (or beat) with the received reflection of the transmitted wave by the mixer 130 to generate the beat signal 135. A spectrum of the beat signal 135 comprises spectrum peaks corresponding to the reflections from one or multiple objects in the scene. Further, the beat signal 135 is distorted due to the non-linearity of the modulation.

At step 340, samples of the distorted beat signal 135 may be generated using the ADC 160.

At step 350, signals at predetermined frequencies may be passed by the frequency filter 117. The frequency-filter 117 is operatively connected to the emitter 110 passing the linearly modulated wave 115 transmitted by the emitter 110 at different time instances at the predetermined frequencies to generate measurements of the linearly modulated wave 115 in a time domain. In particular, the Fabry-Perot etalon 200 generates an etalon signal such that a shift is introduced in the transmission peaks of the etalon signal to other wavelengths. The shift in the transmission peaks of the etalon signal causes frequency sweeping. Accordingly, the peaks of the etalon signal can be sampled in the time domain that results in a sparse signal that is sparsely sampled for different time instances.

At step 360, the measurements of the linearly modulated wave 115 may be converted from the time-domain into a frequency domain to produce a non-linear frequency signal. The non-linear frequency signal comprises a known linear component representing the desired linear modulation and an unknown non-linear component representing the non-linearity of the modulation.

At step 370, coefficients of a basis function approximating a difference between the non-linear frequency signal and the linear frequency component may be determined in the frequency domain. To that end, the processor 140 may be configured to estimate coefficients of the basis function by solving a least square problem to minimize the difference. The estimated coefficients of the basis function may be a function of a polynomial component and peak time instants.

At step 380, distortion in the spectrum peaks for the distorted beat signal 135 is compensated based on the coefficients of the basis function. The compensated beat signal may be used further to determine the distances of one or multiple objects from the emitter 110. The distances of one or multiple objects may be determined based on phase information comprised by the compensated beat signal 135.

The FMCW-based system 100 may be implemented in different embodiments. Such implementations of the FMCW-based system 100 are described below with reference to FIG. 4 and FIG. 5.

Figure 4:
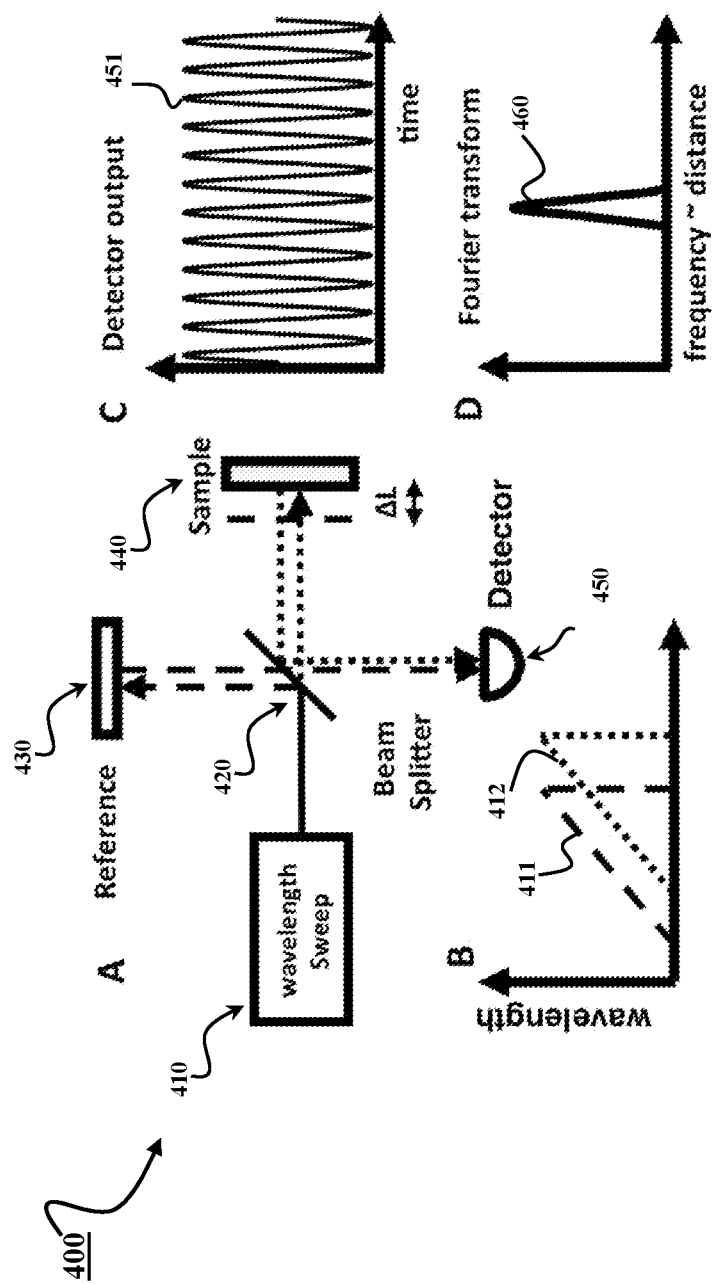
FIG. 4 illustrates a schematic of the FMCW-based system implemented as an FMCW-based swept-source optical coherent sensing (SS-OCT) system, according to an example embodiment.

FIG. 4 illustrates a schematic of FMCW-based system 100 implemented as an FMCW-based swept-source optical coherent sensing (SS-OCT) system 400a, according to an example embodiment. In some implementations, the swept-source OCT system includes a reference arm, a sample arm, and a photodetector. The light is generated from a frequency-swept (or wavelength sweep) laser source 410 with a time-frequency pattern, such as a pattern 411, which is split by a beam splitter 420 to both a reference mirror 430 and a sample of interest 440 (hereinafter also referred as "sample 440"). Backscattered and reflected light from the sample 440 is interfered (or beat) with reflection from the reference mirror 430 with a time-frequency pattern, such as a pattern 412. Further, a beat signal 451 is detected by the detector 450. At a fixed sweep rate, different beat frequencies correspond to different delays or reflections from different depths in the sample 440. Thus, by applying the Fourier transform, the beat signal 451 can produce a beat frequency spectrum 460 where the spectrum peak frequency corresponds to the distance. In some embodiments, an axial profile of reflection magnitude vs. depth is obtained based on the interference signal 460. In conjunction with x-y scanning, multiple axial scans may be used to create 2D and 3D comprehensive, volumetric data sets that may be used to construct arbitrary cross-sectional images, projections along arbitrary axes, or renderings similar to Magnetic Resonance Imaging (MRI) or Computed Tomography (CT).

Figure 5:
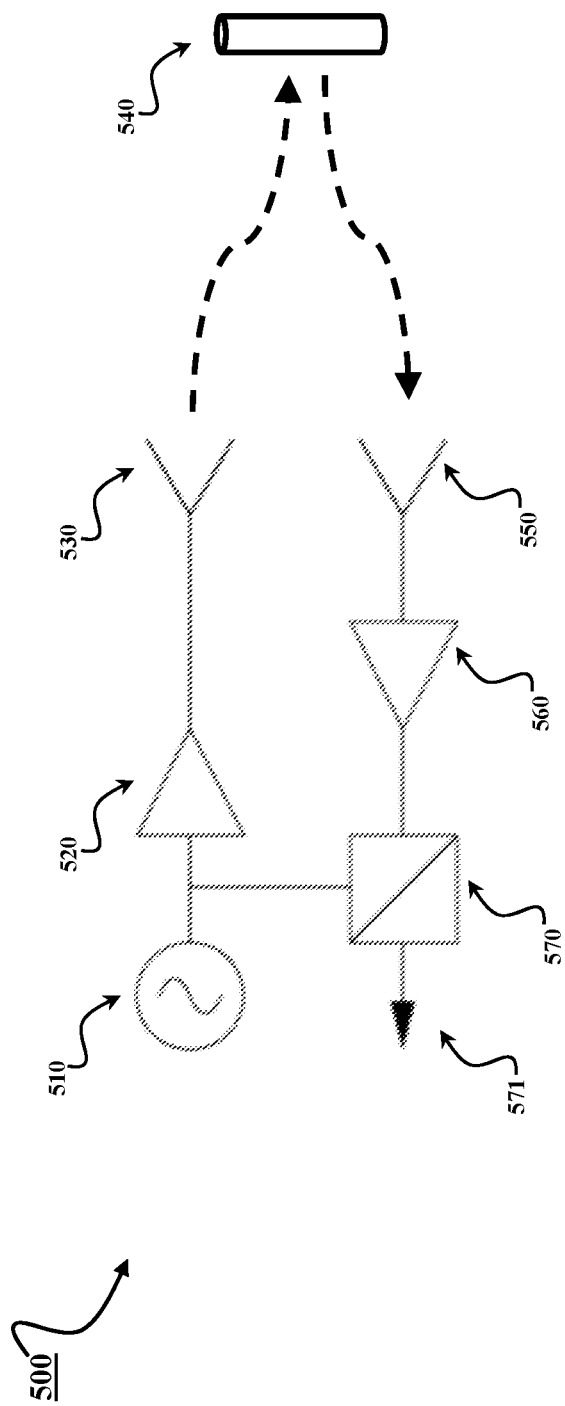
FIG. 5 illustrates a schematic of the FMCW-based system implemented as an FMCW-based ranging system, according to an example embodiment.

FIG. 5 illustrates a schematic of FMCW-based system 100 implemented as an FMCW-based ranging system 500, according to an example embodiment. The FMCW-based ranging system 500 emits a waveform to at least one reflector 540, receives the reflected waveform, mixes the reflected waveform with the transmitted waveform, and generates a beat signal, according to different embodiments. The beat signal is of lower frequency than the transmitted modulated wave. Therefore, the beat signal is sampled by using an analog to digital converter. Further, based on the estimated non-linearity of the sampled beat signal is compensated.

The FMCW-based ranging system 500 includes an FMCW source 510 that sweeps the frequency over a short period of time (e.g., [77, 81] GHz for automotive radar). The source FMCW waveform may be generated by a baseband FMCW waveform (e.g., [−2, 2] GHz) and an up-converter to modulate the baseband FMCW waveform to the carrier frequency (e.g., 79 GHz). The source FMCW waveform may be further amplified by a power amplifier 520 before feeding into transmitting antennas 530. The transmitting antennas 530 send the source FMCW waveform towards the scene to detect potential at least one reflector 540. A reflected waveform from at least one reflector 540 is captured by the receiving antennas 550. The received waveform may be further passed through an LNA 560 to increase signal-to-noise ratio (SNR). Further, the received waveform is mixed with the source FMCW waveform by the mixer 570. Consequently, a beat signal 571 is generated which may be further processed to estimate non-linearity in the beat signal and compensate the estimated non-linearity. Hence, sensitivity of the FMCW-based electromagnetic sensing system 500 is improved.

Figure 6:
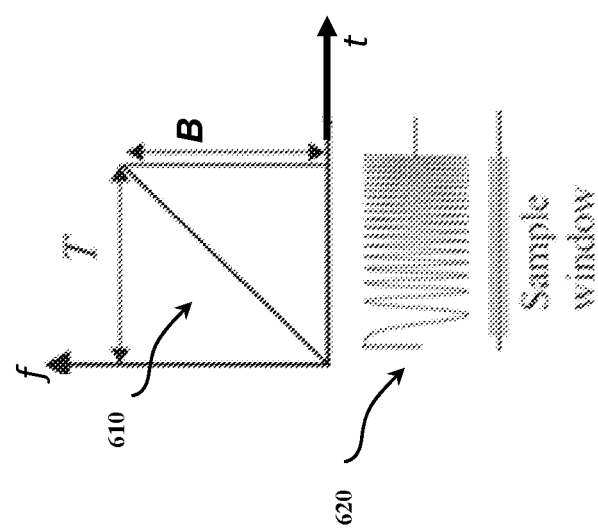
FIG. 6 is a schematic illustrating a FMCW waveform used by an FMCW-based ranging system, according to an example embodiment.

FIG. 6 is a schematic illustrating a FMCW waveform used by an FMCW-based ranging system 600, according to an example embodiment. For a scan, the FMCW (transmitted) waveform possesses a linear frequency pattern 610 over a time period T and a time-domain waveform similar to 620. Further, a transmission frequency f of the FMCW waveform sweeps over a bandwidth B. For the scan, the FMCW-based ranging 600 system is able to detect the distance of multiple reflectors, where the multiple reflectors may be stationary.

In an example embodiment, the receiver 120, itself, comprises the mixer 130, and the ADC 170. Thus, the receiver 120 on reception of the reflection of the transmitted wave 125 may generated the beat signal 135 using the mixer 130 and further sample the beat signal 135 using the ADC 170 to convert the beat signal 135 from an analog domain to a digital domain for further analysis by the processor 140. An exemplary receiver configured to analyze the beat signal 135 is described below with reference to FIG. 7A.

Figure 7A:
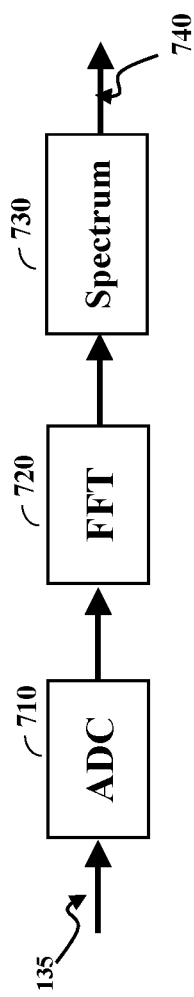
FIG. 7A is a block diagram illustrating a receiver of the FMCW-based system, according to an example embodiment.

FIG. 7A is a block diagram illustrating the receiver 120 of the FMCW-based system 100, according to an example embodiment. In this embodiment, the analog-to-digital converter (ADC) 710 samples the analog beat signal 135 into a digital beat signal. The digital beat signal is further transformed into the frequency domain by a Fourier transformer (FFT) 720. Consequently, a spectrum 730 of the beat signal 135 over frequency is obtained which describes the reflected energy distribution over the range domain. To determine the range information of a number of strong reflectors, their corresponding peak frequencies may be identified. The peaks may be distorted due to impairments in the transmitted wave (or the modulated wave 115) causing non-linearity in the beat signal 135. The source of non-linearity is estimated, and the beat signal 135 is compensated based on the estimated source of non-linearity. Further, the compensated beat signal is used to determine distance information 740 associated with the reflectors.

Further, time domain waveforms and time-frequency patterns of the linearly modulated wave 115 (or FMCW wave) and the beat signal 135 are analyzed below with references to FIGS. 7B, 7C, 7D, and 7E.

Figure 7B:
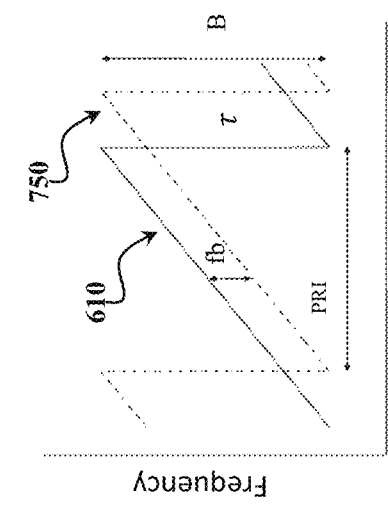
FIG. 7B is a schematic illustrating a time-domain FMCW waveform, according to an example embodiment.
Figure 7C:
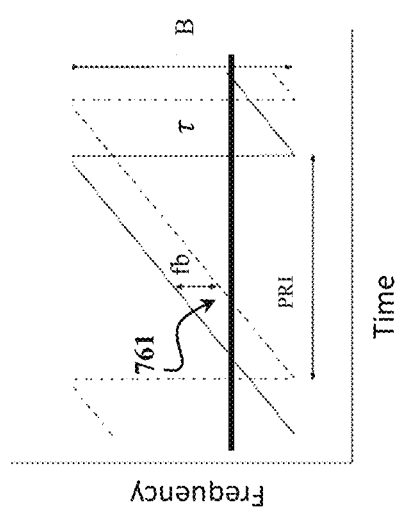
FIG. 7C is a schematic illustrating a time-frequency pattern of the FMCW waveform, according to an example embodiment.
Figure 7D:
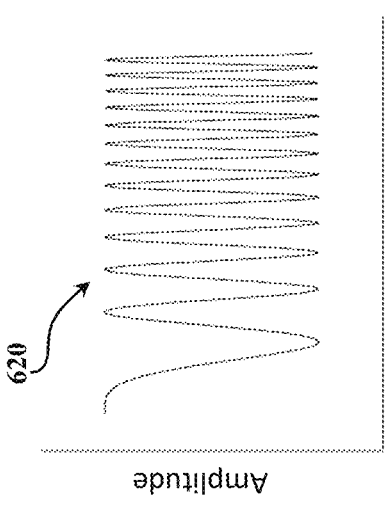
FIG. 7D is a schematic illustrating a time-domain waveform of a beat signal, according to an example embodiment.
Figure 7E:
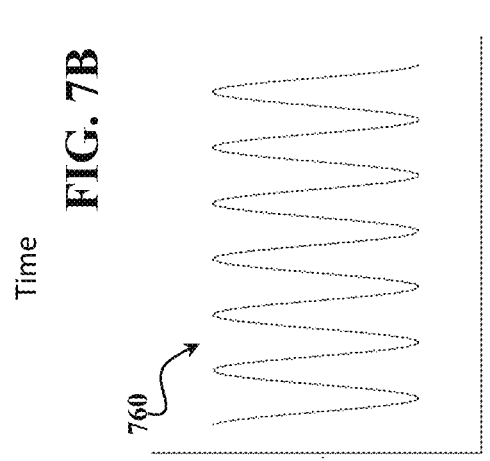
FIG. 7E is a schematic illustrating a time-frequency pattern of the beat signal, according to an example embodiment.

FIG. 7B is a schematic illustrating a time-domain FMCW waveform 620, according to an example embodiment. FIG. 7C is a schematic illustrating the time-frequency pattern 610 of the FMCW waveform, according to an example embodiment. FIG. 7D is a schematic illustrating a time-domain waveform of a beat signal 760, according to an example embodiment. The time-domain waveform of the beat signal 760 is obtained by mixing the transmitted waveform with the reflected waveform. In FIG. 7D, the transmitted waveform corresponds to the modulated signal 115, and the reflected waveform correspond to the reflection 125 of the transmitted wave (i.e., the modulated signal 115). FIG. 7E is a schematic illustrating a time-frequency pattern of the beat signal, according to an example embodiment. Due to a round-trip delay from the transmitter to a single reflector, the time-frequency pattern 750 of the reflected FMCW waveform is shifted to the right as shown in FIG. 7C. The mixer 130 generates the beat signal 760 as shown in FIG. 7D. For a single reflector, the beat signal dominates at one frequency which corresponds to its distance to the transmitter. In other words, the time-frequency pattern 761 of the beat signal (in FIG. 7E) is parallel to the time axis.

Figure 8A:
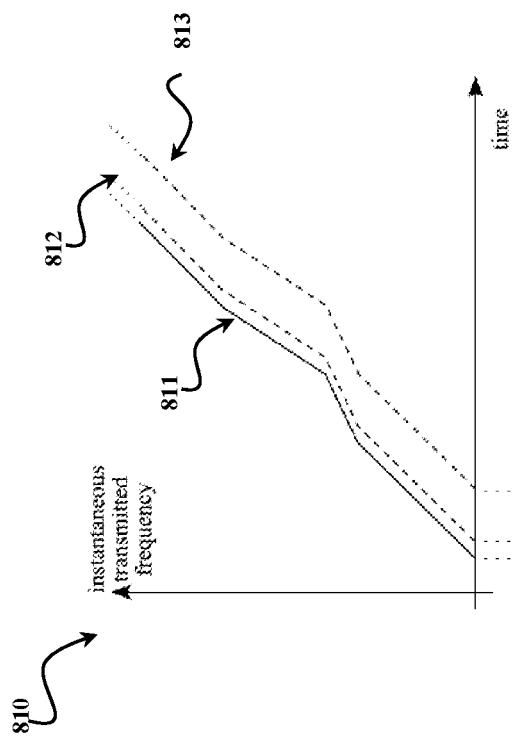
FIG. 8A is a schematic illustrating a time-frequency pattern of transmitted and reflected FMCW waveforms in a presence of a source of nonlinearity, according to an example embodiment.
Figure 8B:
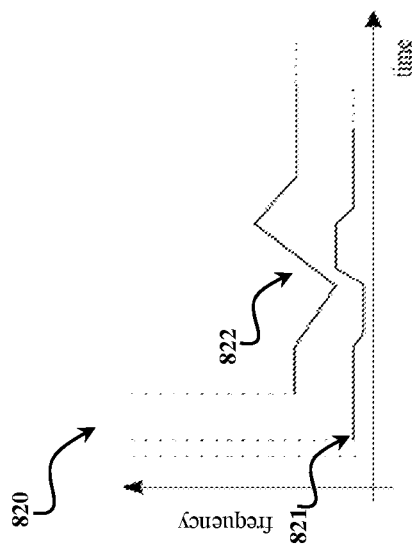
FIG. 8B is a schematic illustrating a time-frequency pattern of a beat signal for two reflectors at two distances in the presence of the source of nonlinearity, according to an example embodiment.

FIG. 8A is a schematic 810 illustrating a time-frequency pattern of the transmitted and reflected FMCW waveforms in a presence of a source of nonlinearity, according to an example embodiment. FIG. 8B is a schematic 820 illustrating the time-frequency pattern of the beat signal for two reflectors at two distances in the presence of the source of nonlinearity, according to an example embodiment. The FMCW-based sensing system requires an ideal linear frequency pattern to determine the distance of reflectors from the beat signal (e.g., the beat signal 135). When there is a source nonlinearity caused by hardware impairments, low-cost components, and open-loop VCOs, the time-frequency pattern 811 is no longer completely linear. For two reflectors at different distances to the transmitter, the time-frequency pattern of the reflected signal is then shifted according to the corresponding round-trip delay. For example, the time-frequency pattern of the closer reflector is shown by dashed line 812, while the further reflector has a time-frequency pattern shown by dashed line 813. When both reflected signals from two different reflectors are mixed with the source signal, the beat signal includes two components, which show different distortions due to the source nonlinearity. Particularly, the closer reflector provides the beat signal with the time-frequency pattern 821, while the further reflectors provide the beat signal with the time-frequency pattern 822. Even with the same source nonlinearity, its effect on the spectrum of the beat signal is range-dependent. When the source nonlinearity function and the range information of reflectors are both unknown, mitigating the distortion in the beat signal is difficult.

Further, an in-depth (mathematical) analysis of estimating the source of non-linearity in the modulated signal 115 and compensating the non-linearity in the beat signal 115 is performed. To that end, a comparative analysis between an FMCW based system with a reference arm (conventional method to estimate non-linearity) and the FMCW-based system without the reference arm (i.e., the proposed method to estimate non-linearity by using the frequency filter 117) is performed. For ease of understanding SS-OCT system (describe with reference to FIG. 4) which is one of the FMCW-based systems is used for analysis.

Exemplar Formulation

Consider the FMCW-based SS-OCT system, for comparative analysis between the accuracy of non-linearity estimation with and without reference arm. The SS-OCT system is configured to measure the non-linearity using the reference arm and further configured to measure the non-linearity using the measuring arm (i.e., without using the reference arm). SS-OCT comprises a swept-source laser configured to send a unit magnitude swept-frequency signal (in equation 1) to the measurement arm:

$$s_t(t)=e^{j2\pi(f_c t+0.5\alpha t^2+\epsilon(t))} \quad (1)$$

where t is the time variable, $f_c$ is the carrier frequency, a is the frequency sweep rate or chirp rate, and $\epsilon(t)$ is the source nonlinearity phase function. For a perfectly linearly swept-source, $\epsilon(t)=0$, i.e., the instantaneous frequency $f(t)=f_c+\alpha t$ follows a linear pattern.

For a stationary reflector at a distance of R, a received signal (or a reflected signal) is a delayed and attenuated/enhanced copy of the transmitted signal (in equation 2) is obtained:

$$s_r(t)=As_t(t-\tau)=Ae^{j2\pi(f_c(t-\tau)+0.5\alpha(t-\tau)^2+\epsilon(t-\tau))}, \quad (2)$$

where A is proportional to the reflectivity of the stationary target, and $\tau=2R/c$ is the time delay.

The reflected signal is then mixed with the same source laser signal, delayed by an optical delay line (ODL), to generate the baseband beat signal (for example, the beat signal 135) (represented in equation 3) via an integrated coherent receiver (ICR):

$$s_b(t)=s_r(t)s_t^*(t)=Ae^{j2\pi(f_c\tau+\alpha\tau t-0.5\alpha\tau^2+(\epsilon(t)-\epsilon(t-\tau)))}, \quad (3)$$

With a perfect linearly swept-source $\epsilon(t)-\epsilon(t-\tau)=0$ in equation (3) and the beat signal is a complex sinusoidal signal with $f_b=\alpha\tau$ (or, equivalently, angular frequency $\omega_b=2\pi\alpha\tau$).

On the other hand, when the source non-linearity $\epsilon(t)$ is present, the beat signal in equation (3) will no longer be a sinusoidal signal due to $\epsilon(t)-\epsilon(t-\tau)\neq 0$ in phase. As a result, the spectrum peak of the beat signal is spread, resulting in degradation in the range resolution and signal-to-noise ratio (SNR).

Accordingly, the above analysis of estimating non-linearity may be extended to the case of multiple reflectors. Assuming K reflectors at $\{R_1, \ldots, R_K\}$, the reflected signal is given as:

$$s_r(t)=\sum_{k=1}^{K} A_k s_t(t-\tau_k) = \sum_{k=1}^{K} A_k e^{j2\pi(f_c(t-\tau_k)+0.5\alpha(t-\tau_k)^2+\epsilon(t-\tau_k))} \quad (4)$$

where $\tau_k=2R_k/c$. After the ICR, the baseband beat signal is given as:

$$s_b(t)=\sum_{k=1}^{K} A_k e^{j2\pi(f_c\tau_k+\alpha\tau_k t-0.5\alpha\tau_k^2+(\epsilon(t)-\epsilon(t-\tau_k)))}, \quad (5)$$

where $\epsilon(t)=0$, the beat signal form multiple peaks at corresponding beat frequencies of $f_{b_k}=\alpha\tau_k$. In the case of source nonlinearity, the resulting phase distortion at the beat signal is range dependent due to the dependence of the term $\epsilon(t)-\epsilon(t-\tau_k)$ on $\tau_k$.

Therefore, to compensate the nonlinearity, the impact of source non-linearity $\epsilon(t)$ on the resulting beat signal should be mitigated, and the beat frequency that yields range estimates of multiple reflectors correctly should be estimated.

Conventionally, the non-linear compensation method uses the reference arm with a known reference target. The reference arm employs two delay paths with a known relative delay of $\Delta L$ and generates the corresponding reference beat signal, denoted as $s_b(t)$. If the relative delay of $\Delta L$ is known, different nonlinearity compensation algorithms can be used.

In one approach, it is assumed that the relative delay is small and the phase residual term $\epsilon(t) - \epsilon(t - \tau_{ref})$ in (5) can be approximated using the first-order local expansion (as shown in equation 6)

$$\epsilon(t) - \epsilon(t - \tau_{ref}) \approx \tau_{ref} \epsilon'(t), |t - \tau_{ref}| \leq \zeta \quad (6)$$

where $\tau_{ref} = \Delta L/c$ is the reference delay and is a small quantity. Then the nonlinearity which is represented by $\epsilon'(t)$ may be estimated from the reference beat signal $s_b(t)$. Further, let the estimated nonlinearity term be denoted as $\hat{\epsilon}'(t)$, and the nonlinearity can be compensated to the measurement arm by applying a conjugate $e^{-j\tau_{ref}\hat{\epsilon}'(t)}$. Thus, from equation (6), it may be observed that approximation error in (6) aggregates, when the distance of reflector is far away from the reference distance.

In another approach, a residual-video-phase (RVP) or deskew-filtering is used. Still relying on the dedicated reference arm with the estimated nonlinearity function $\hat{\epsilon}'(t)$, the nonlinearity effect in the entire range of interest may be removed using the RVP or the deskew filtering. The approach consists of three steps. First, the source nonlinearity term $\epsilon(t)$ originated from the transmitter side is removed:

$$s_2(t) = s_b(t)e^{-j2\pi\hat{\epsilon}(t)} \approx Ae^{j2\pi(f_c\tau + \alpha\tau t - 0.5\alpha\tau^2 - \epsilon(t-\tau))} \quad (7)$$

Then, the deskew filtering with range-dependent time shifts is introduced to the above initially compensated $s_2(t)$ by multiplying the term of $e^{-j\pi f^2/\alpha}$ in the frequency domain:

$$s_3(t) = \mathcal{F}^{-1}\left\{s_2(f)e^{j\pi\frac{f^2}{\alpha}}\right\} = Ae^{j2\pi(f_c\tau + \alpha\tau t) - \epsilon_{RVP}(t)} = Ae^{j2\pi(f_c\tau + \alpha\tau t)}s_{RVP}^*(t) \quad (8)$$

where $s_2(f)$ is the spectrum of $s_2(t)$ and $$s_{RVP}(t) = e^{j2\pi\epsilon_{RVP}(t)} = \mathcal{F}^{-1}\left\{\mathcal{F}\left(e^{j2\pi\hat{\epsilon}(t)}\right)e^{j\pi\frac{f^2}{\alpha}}\right\} \quad (9)$$

Since $\hat{\epsilon}(t)$ is known, so is $s_{RVP}(t)$. Therefore, the last step is to compensate $s_{RVP}(t)$ in $s_3(t)$ $$s_4(t) = s_3(t)s_{RVP}(t) = Ae^{j2\pi(f_c\tau + \alpha\tau t)} \quad (10)$$

The last step removes the nonlinearity effect in the measured beat signal and forms a peak at the correct beat frequency of $\alpha\tau$. The above analysis holds for the case of multiple reflectors. By using entire-range deskew filtering instead of a local-range compensation better performance can be achieved. Deskew filtering is described in detail with reference to FIG. 14 later below. Further, the accuracy of estimating $\epsilon(t)$ maybe improved, by using a parametric model, i.e., polynomial phase signal (PPS) model, where the PPS model describes the non-linearity source function which is a time-varying smooth function, and then estimate the parametric model coefficients from the response of a reference.

Finally, a k-sampling method has been applied to the nonlinearity compensation for the SS-OCT. In the k-sampling method, a k-sampling clock is generated in the reference arm by using the interference signal with a known delay $\Delta L$ between two paths detected by the photodiode (PD). Further, the beat signal in the measurement arm is sampled by the analog-to-digital converter (ADC) with the k-sampling clock. The sampled beat signal is then analyzed using the FFT to locate spectrum peaks for ranging. Particularly, if the k-sampling theorem is satisfied between the measurement and reference arms, the maximum measurement range $L_{max}$ is given by equation (11)

$$L_{max} = 1/4 n_r \Delta L \quad (11)$$

where nr and $\Delta L$ are, respectively, the refractive index and the length of the fiber delay line in the reference arm, given that the measurement arm is Michelson-type while the reference arm is Mach-Zehnder-type. When the peak frequency is located at the p-th FFT bin in the spectrum, the distance estimate $\hat{L}$ is given as:

$$\hat{L} = \frac{p}{N/2} L_{max} = \frac{n_r \Delta L}{2N} p \quad (12)$$

where N is the number of data used in the FFT analysis. Since the beat spectrum is discrete, the exact distance cannot be obtained from the peak position of the beat spectrum. The exact distance is evaluated by interpolation, e.g., parabolic fitting, around the peak in the spectrum.

The present disclosure proposed system (e.g., the FMCW-based system 100) that accurately estimates the source of non-linearity and compensates the estimated source of non-linearity without using the dedicated reference arm. To implement the SS-OCT system without the reference arm to remove the non-linearity, initially, an etalon signal (i.e., the modulated signal 115 sampled by the frequency filter 117 implemented using etalon) is sparsely sampled in the time-domain to track laser comb wavelengths over time. With the etalon signal, at first the source nonlinearity in the frequency domain $\epsilon'(t)$ is estimated and then the estimated $\epsilon'(t)$ is used to compensate the beat signal in the measurement arm (in FIG. 11A). Thus, by removing the reference arm, the proposed system becomes very cost-effective while maintaining higher accuracy.

Nonlinearity Estimation from Etalon Signal

The etalon signal tracks the source laser wavelengths at coarsely sampled time instants. In the etalon, the refractive index of the medium between two mirrors increases as the incident optical field increases in intensity, resulting in a shift of the transmission peaks of the etalon to other wavelengths. The shifting of the transmission peaks of the etalon to other wavelength causes frequency sweeping. The transmission peaks can be traced by the time-domain output etalon signal as shown in FIG. 10A. Particularly, the etalon signal always outputs a certain number of peaks at given wavelengths.

Figure 9A:
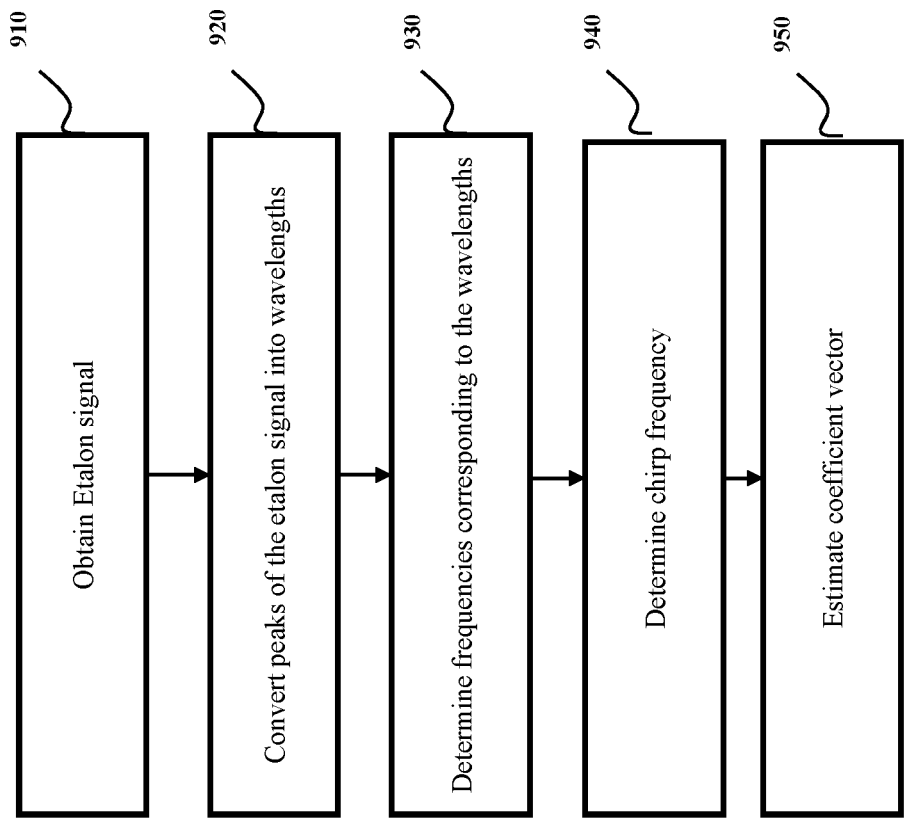
FIG. 9A illustrates a method for estimating the source of non-linearity from an etalon signal generated by the optical etalon, according to an example embodiment.
Figure 9B:
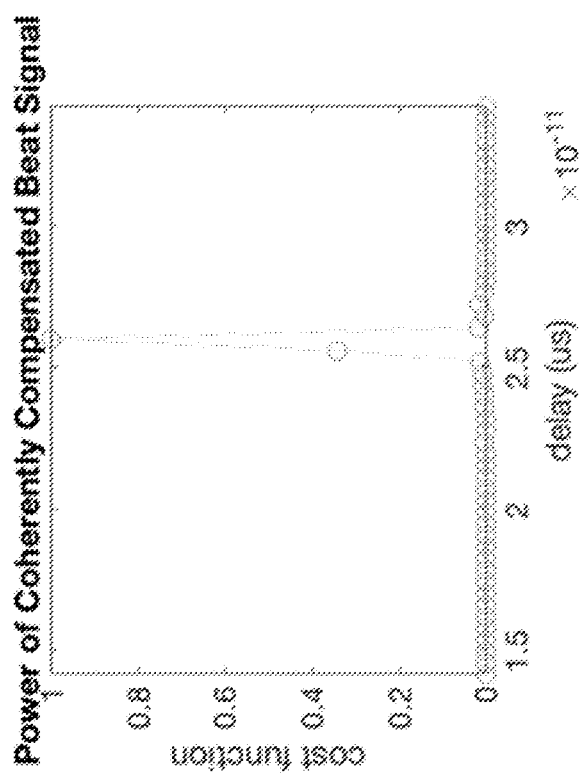
FIG. 9B shows the cost function to determine delay and distance by coherently accumulating a compensated beat signal using an estimated nonlinearity function from the etalon signal, according to an example embodiment.

FIG. 9A illustrates a method 900 for estimating a source of non-linearity from an etalon signal generated by the optical etalon, according to an example embodiment. FIG. 9A is explained below with reference to FIG. 9B and FIG. 10A, where FIG. 10A shows the etalon signal and non-linearity function estimation from the etalons signal. FIG. 9B shows a cost function to determine delay and distance by coherently accumulating a compensated beat signal using an estimated nonlinearity function from the etalon signal, according to an example embodiment. FIG. 10A shows an exemplary etalon signal generated by the optical etalon (such as the Fabry-Perot etalon 200), according to an example embodiment. FIG. 10B shows a non-linear frequency swept, according to an example embodiment. FIG. 10C shows a linear component of a non-linear swept frequency, according to an example embodiment. FIG. 10D shows a non-linear component of the non-linear swept frequency, according to an example embodiment.

Method 900 may be implemented by the processor 140. At step 910, the etalon signal (e.g., FIG. 10A) may be obtained. At step 920, the etalons peaks may be converted into wavelength based on the mathematical expression of equation (13):

$$\lambda(t) = \lambda_c \left(1 + \frac{m_e - 1 - m_c}{p_e - (m_e - 1 - m_c)}\right) \quad (13)$$

where $\lambda_c$ is the base wavelength, $m_e$ is the peak index (e.g., $m_e = \{1, 2, \ldots, 22\}$ in FIG. 10A), $m_c$ is the index of the peak at the center (e.g., $m_c = 11$ in FIG. 10A), and $P_e$ is the order of etalon (e.g., $P_e = 300$).

At step 930, the frequency corresponding to the wavelength determined at step 920 is obtained based on equation (14):

$$f(t) = \frac{c}{n_r \lambda(t)} \quad (14)$$

For the etalon signal in FIG. 10A, frequencies converted from the wavelengths corresponding to the peaks are shown in red dots in FIG. 10B.

Further, to estimate the nonlinearity function, at step 930 the swept frequency f(t) is decomposed as a sum of a linearly swept-frequency term and a polynomial component of order P, $$f(t) = (f_c + \alpha t) + \sum_{i=2}^{P} \beta_i t^i, \quad (15)$$

where the term within the bracket represents the ideal linearly swept frequency and $\{\beta_i\}_{p=0}^{P}$ are unknown coefficients for the nonlinearity function. At step 940, the center frequency $f_c$ at the peak point which gives the largest frequency change over all chosen peaks is determined. On the other hand, the linear frequency signal is a linear function of time with a constant term of a center frequency $f_c$ at an etalon peak with the largest frequency change over all of the etalon peaks and a time coefficient of a relative frequency change over a time interval between two neighboring etalon peaks measured at two neighboring instances of time.

At step 940, the chirp rate a is determined by relative frequency change from the center frequency to the next frequency point over the time interval between the two peaks. As shown in FIG. 10C, the red dot denotes the determined center frequency, and the blue line denotes the chirp rate.

Further, by denoting $f_r(t) = f(t) - (f_c - \alpha t)$, the nonlinearity coefficients $\beta_i$ can be estimated by a least-square solution. To that end, all values of $f_r(t)$ are grouped, i.e., $f_r = [f_r(t_1), \ldots, f_r(t_M)]^T$ at the M peak time instants, $t = [t_1, \ldots, t_M]^T$. Then at step 950, the coefficient vector $\beta = [\beta_2, \ldots, \beta_P]^T$ can be estimated as:

$$\hat{\beta} = (T^T T)^{-1} T^T f_r \quad (16)$$

where the matrix $T = [t_0, t_1, \ldots, t_P]$. FIG. 10D shows the estimated non-linearity function $\sum_{i=2}^{P} \hat{\beta}_i t^i$ with $\hat{\beta}_i$ estimated from the equation (16). In FIG. 10D, it is seen that the frequency-domain nonlinearity function is less than 0 before the center peak and larger than zero after it. From FIG. 10B, the reconstructed swept frequency $\hat{f}(t)$ (denoted as black curves) agrees with the original frequency pattern from the etalon signal in red dots.

Nonlinearity Estimation

Let the estimated frequency-domain nonlinearity function be denoted as $\hat{\epsilon}'(t) = \sum_{i=2}^{P} \hat{\beta}_i t^i$, where $\hat{\beta}_i$ is from equation (16). The phase-domain non-linearity function can be recovered as:

$$\hat{\epsilon}(t) = \sum_{i=2}^{P} \hat{\beta}_i \frac{t^{i+1}}{i+1} + \phi \quad (17)$$

where $\phi$ is a fixed but unknown phase term. To compensate the phase-domain non-linearity $\hat{\epsilon}(t)$ of equation (17), the deskew-filtering approach may be applied.

In some embodiments, the non-linearity compensation method for joint distance estimation and non-linearity compensation is used. At first, from equation (3), the noisy beat signal at the measurement arm is given as:

$$y_b(t) = x_b(t) + v_b(t)$$

$$i. = A e^{j2\pi(f_c\tau + \alpha\tau t - 0.5\alpha\tau^2(\epsilon(t) - \epsilon(t-\tau)))} + v_b(t), \quad (18)$$

where $v_b(t)$ is the measurement noise. The idea is to coherently sum the compensated beat signal with the determined parameter set $\{f_c, \alpha, \beta_i\}$ as shown in FIG. 9B. To that end, the cost function is constructed as:

$$\eta(\zeta) = |\Sigma_t y_b(t) e^{-j2\pi(f_c\zeta + \alpha\zeta t - 0.5\alpha\zeta^2 + [\hat{\epsilon}(t) - \hat{\epsilon}(t-\zeta)])}|^2 \quad (19)$$

where $\hat{\epsilon}(t)$ is from equation (17). From equation (19), it can be observed that $\zeta = \tau$, the compensated beat signal is coherently combined. By locating the maximum of the cost function, the delay can be estimated as $\hat{\tau} = \arg\max_\zeta \eta(\zeta)$.

With the estimated delay $\hat{\tau}$, the optimally compensated beat signal is reconstructed as:

$$\hat{x}_b(t) = y_b(t) e^{-j2\pi(\hat{\epsilon}(t) - \hat{\epsilon}(t-\hat{\tau}))} \quad (20)$$

In this way, an optimally compensated beat signal can correct the spectrum spread of the originally measured beat signal (e.g., beat signal 135) and form a sharp peak around the correct beat frequency. This is further explained below with numerical results. To that end, a comparative analysis between the proposed reference-arm free approach and the k-sampling method using the reference arm is provided below with reference to FIG. 11A.

Figure 11A:
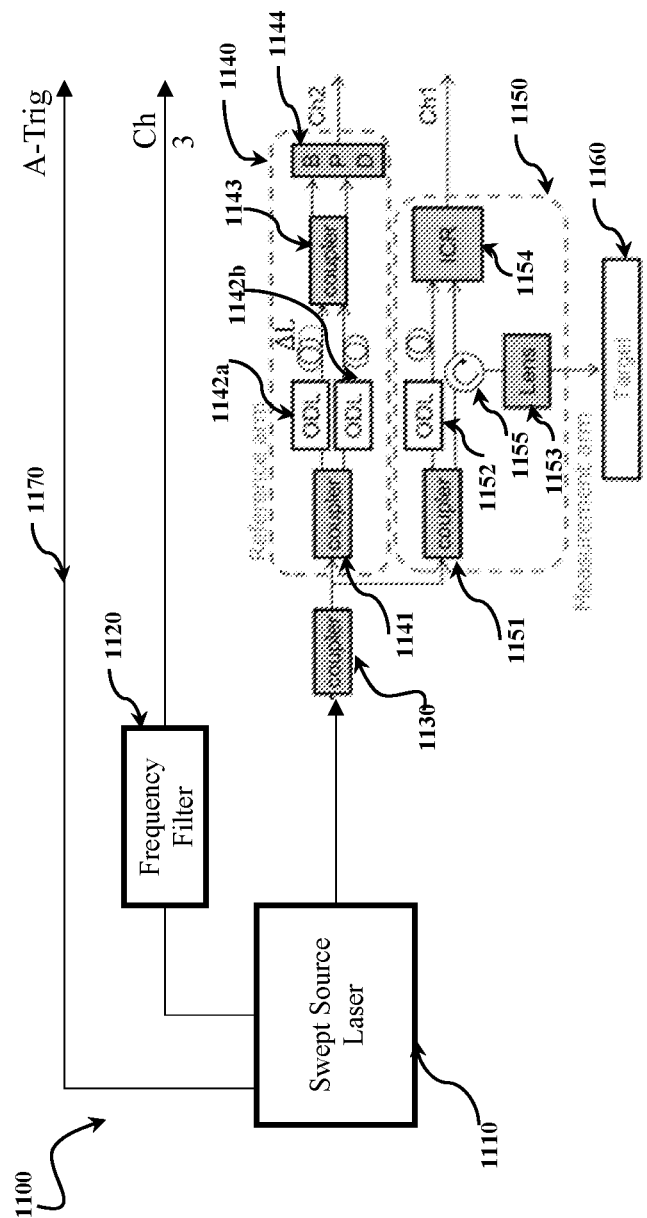
FIG. 11A illustrates the experimental setup of the SS-OCT system implemented to compare a reference-arm free approach with a k-sampling method using a reference arm, according to an example embodiment.
Figure 11C:
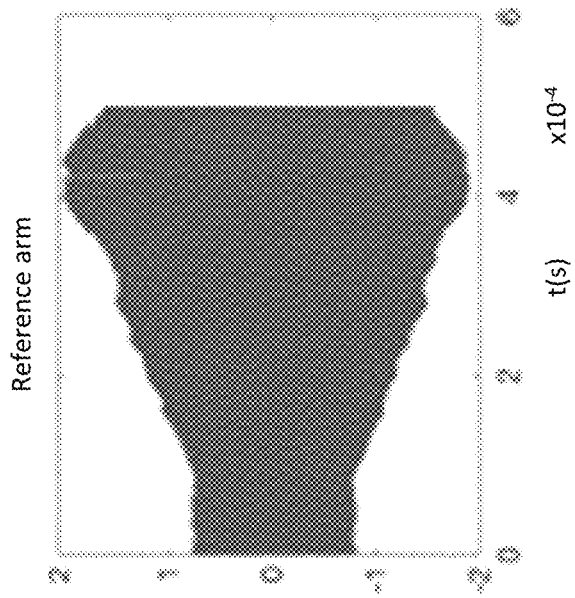
FIG. 11C shows a reference signal from the reference arm, according to an example embodiment.
Figure 11B:
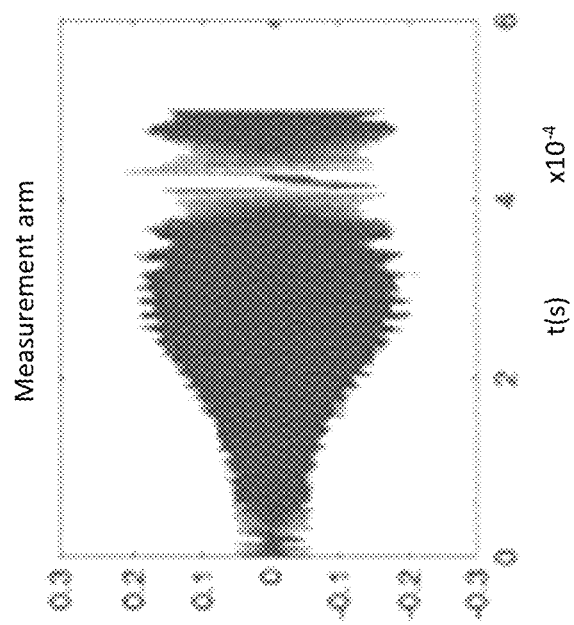
FIG. 11B shows a time-domain beat signal from a measurement arm, according to an example embodiment.

FIG. 11A illustrates the experimental setup of the SS-OCT system 1100 implemented to compare a reference-arm free approach with a k-sampling method using a reference arm, according to an example embodiment. FIG. 11A is described below in conjunction with FIG. 11B and FIG. 11C. FIG. 11B shows the time-domain beat signal from the measurement arm 950 (ch1), according to an example embodiment. FIG. 11C shows the reference signal from the reference arm 940 (ch2), according to an example embodiment.

In FIG. 11A, the SS-OCT system 1100 (also called as "a system 1100") comprises a swept-source laser 1110, a frequency filter 1120, where the frequency filter 1120 corresponds to the frequency filter 117. The SS-OCT system 1100 further comprises the reference arm 1140, a measurement arm 1150, a coupler 1130, and a target (i.e., an object or a reflector) 1160. The reference arm 1140 comprises a first coupler 1141 and a second coupler 1143, a first optical delay line 1142a and a second optical delay line 1142b, and a balanced photo detector (BPD) 1144. Similarly, the measurement arm 1150 comprises a coupler 1151, an optical delay line 1152, a lens 1153, an integrated coherent receiver (ICR) 1154, and a circulator 1155.

For instance, the swept-source laser 1110 emits laser light with a wavelength of 1.55 µm and with a repetition frequency at x kHz. The laser light is then split into the reference arm 1140 (denoted as Ch2 or channel 2) and the measurement arm 1150 (denoted as Ch1 or channel 1). For the reference arm 1140, a k-sampling clock is generated. To that end, the reference arm 1140 comprises a clock generator (not shown in the FIG. 11A). On the other hand, the measurement arm 1150 further splits the laser light into two paths: one path goes through the circulator 1155 and lens 1153 to the target 1160. The laser light is then reflected by the target 1160, where the reflected laser light is interfered with the other path to generate the beat signal.

Meanwhile, an etalon signal, generated by the frequency filter 1120, along with a trigger signal 1170 is generated from channel 3 (or Ch3). For the k sampling-based method (i.e., while using the reference arm 1140), the SS-OCT system 1100 uses signals from ch1 and ch2 for the nonlinearity compensation. On the other hand, for the reference-arm free method, the SS-OCT system 1100 uses the measurement arm 1150 in ch1 and the etalon signal in ch3. From FIG. 11A and FIG. 11B, it can be observed that both time-domain signals are modulated in amplitude.

Figure 12A:
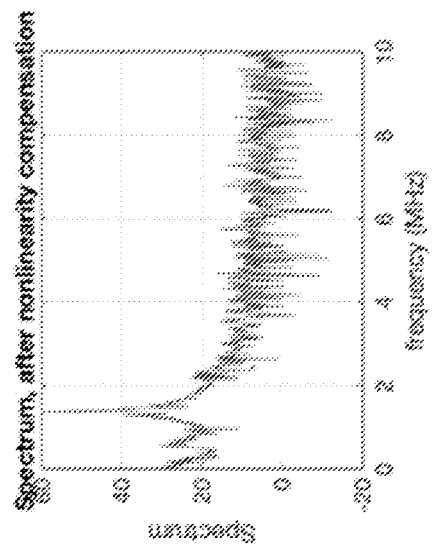
FIG. 12A shows a spectrum of the beat signal from the measurement aim before non-linearity compensation, according to an example embodiment.
Figure 12B:
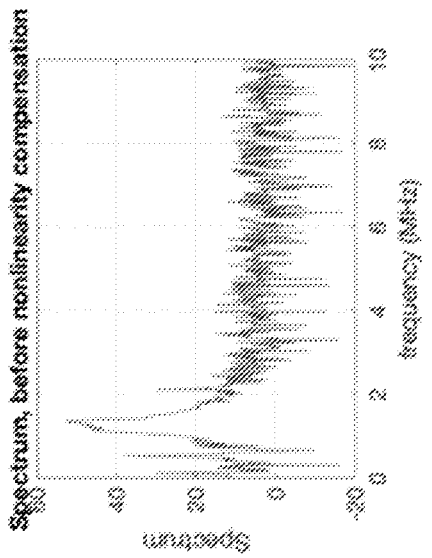
FIG. 12B shows a spectrum of the beat signal from the measurement arm after the non-linearity compensation, according to an example embodiment.

Further, spectra of the beat signal before and after non-linearity compensation from the measurement arm 1150 are compared in FIG. 12A and FIG. 12B.

FIG. 12A shows the spectrum of the beat signal from the measurement arm 1150 before non-linearity compensation, according to an example embodiment. FIG. 12B shows a spectrum of the beat signal from the measurement arm 1150 after the non-linearity compensation, according to an example embodiment. In FIG. 12A, the spectrum of the beat signal from the measurement arm 1150 is spread over a peak that corresponds to the target distance. In fact, the impact of the source nonlinearity causes not only the peak spread but also the shift of the spectrum peak. In contrast in FIG. 12B, is clearly shown that the peak-to-sidelobe level is significantly improved, and the spread peak in FIG. 12B is much more focused around the beat frequency with higher spectrum power of 60 dB.

Figure 13:
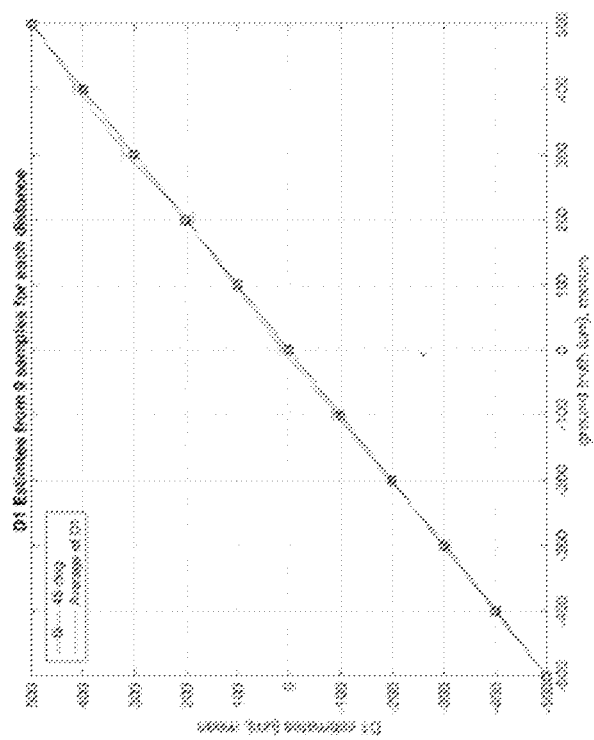
FIG. 13 shows a measured profile of the FMCW-based system without the reference arm, according to an example embodiment.

Further, range estimation performance of the proposed reference arm free approach is evaluated, and results are shown in FIG. 13. To that end, a mirror is placed as the object at 11 distances with a step size of 100 µm. For each distance, the measurements are repeated 10 times to calculate the range estimation statistics, e.g., bias and standard deviation. FIG. 13 shows a measured profile of FMCW-based system without the reference arm, according to an example embodiment. The measured profile corresponds to a set of 11 distances versus a ground truth in the horizontal axis. The result is overlapped with the diagonal 45° line for comparison. For each distance, the mean of these 10 distance estimates from the compensated peak frequency in FIG. 12B and the standard deviation around the mean is plotted. Overall, the results show a small estimation bias (up to 8 µm) and a standard deviation up to 4 µm. Further, it is observed that the estimation bias may be contributed by the amplitude modulation which is not accounted for.

In some embodiment, based on the estimated source of non-linearity deskew filtering approach is used to compensate the beat signal based on the estimated source of non-linearity.

Figure 14:
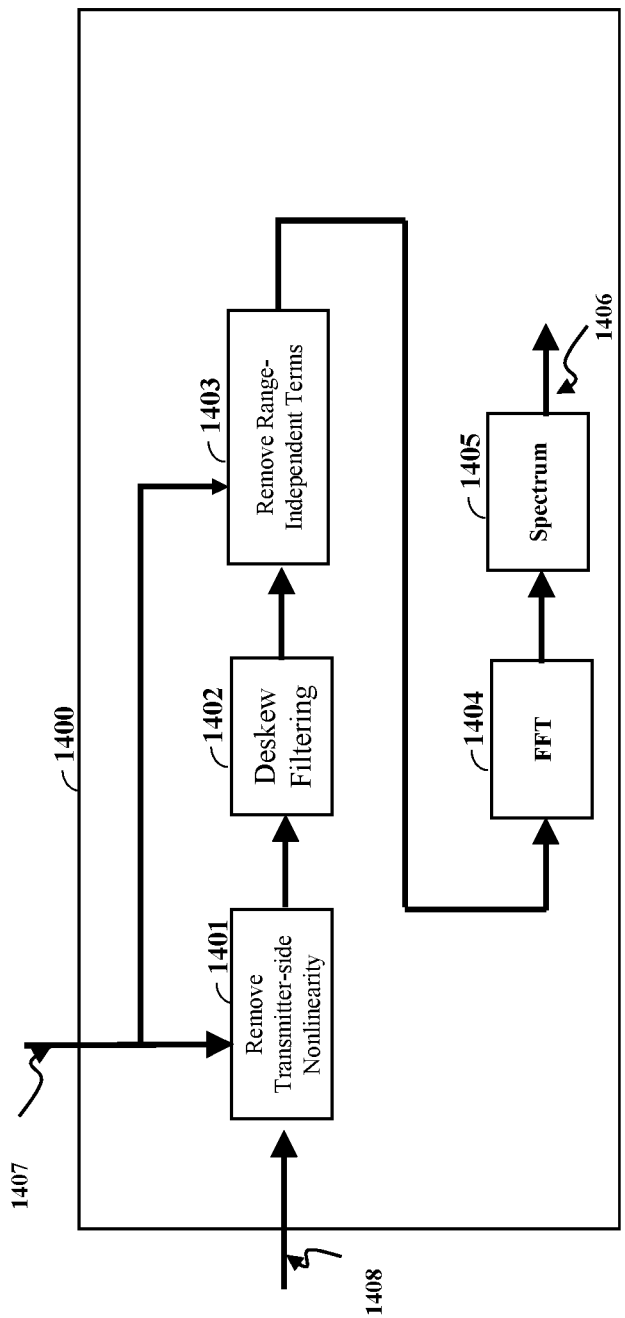
FIG. 14 is a block diagram illustrating a deskew filtering-based step to correct the beat signal with an estimated nonlinearity function, according to an example embodiment.

FIG. 14 is a block diagram 1400 illustrating a deskew filtering process to correct the beat signal with an estimated nonlinearity function, according to an example embodiment. FIG. 14 illustrates a different nonlinearity correction approach, based on the beat signal from unknown reflectors (for example target 1160 in FIG. 11A) and the estimated nonlinearity function (as explained with respect to equation 17) from a reference beat signal.

At step 1401, the nonlinearity resulted from a transmitter side in a beat signal 1408 is removed first using an estimated nonlinearity function 1407. At step 1402, the deskew filter is applied to the initially compensated beat signal. The deskew filter applies range-dependent/frequency-dependent time shifts to the input signal. In other words, an amount of time shifts is different for different frequency components. Since the frequency is directly related to the range for the beat signal, the deskew filter aims to compensate the range-dependent distortion for different reflectors such that the remaining distortion is range-independent. At step 1403, the remaining range-independent distortion for all frequency/range is removed with the help of the estimated nonlinearity function 1407. The fully compensated beat signal is then transformed into the frequency domain by application of an FFT 1404. The range information 1406 of unknown reflectors may be determined by a spectrum 1405 of the beat signal. Accordingly, the effect of non-linear component is controlled.

EMBODIMENTS

The description provides exemplary embodiments only and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further, some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A frequency modulation continuous wave (FMCW)-based system, comprising:
    an emitter configured to transmit at least one wave of radiation to a scene, wherein the transmitted wave is linearly modulated in a frequency domain, and wherein the linear modulation is subject to impairments causing a non-linearity of the transmitted wave in the frequency domain;
    a receiver configured to receive a reflection of the transmitted wave from one or multiple objects in the scene;
    a mixer operatively connected to the emitter and the receiver and configured to interfere a copy of the wave transmitted by the emitter with the reflection of the transmitted wave received by the receiver to generate a beat signal with spectrum peaks corresponding to reflections from the one or multiple objects in the scene, wherein the beat signal is distorted due to the non-linearity of the modulation caused by the impairments;

an analog-to-digital converter (ADC) operatively connected to the mixer and configured to generate samples of the distorted beat signal;

a frequency filter configured to pass signals at predetermined frequencies, the frequency filter is operatively connected to the emitter passing the linearly modulated wave transmitted by the emitter at different time instances at the predetermined frequencies to generate measurements of the modulated wave in a time-domain; and at least one processor configured to:
   convert the measurements of the linearly modulated wave from the time-domain into a frequency-domain to produce a non-linear frequency signal, wherein the non-linear frequency signal comprises a known linear component representing the desired linear modulation and an unknown non-linear component representing the non-linearity of the modulation;
   determine coefficients of a basis function approximating a difference between the non-linear frequency signal and the linear frequency component in the frequency domain; and
   detect one or multiple spectrum peaks in the distorted beat signal with the distortion compensated according to the basis function with the determined coefficients to determine one or multiple distances to the one or multiple objects in the scene.

2. The FMCW-based system of claim 1, wherein a sampling frequency of the measurements of the linearly modulated wave produced by the frequency filter is 1000 times less than a sampling frequency of the ADC.

3. The FMCW-based system of claim 1, wherein the frequency filter includes an etalon producing an etalon signal, such that the samples in the time domain are peaks of the etalon signal at the different time instances making the samples in the time domain sparse.

4. The FMCW-based system of claim 3, wherein the processor is configured to:
   convert the etalon peaks into wavelengths based on a function of an index of each of the etalon peaks; and
   convert the wavelengths into the non-linear frequency signal based on the base wavelength of the etalon and the order of etalon.

5. The FMCW-based system of claim 4, wherein the linear frequency signal is a linear function of time with a constant term of a center frequency at an etalon peak with the largest frequency change over all of the etalon peaks and a time coefficient of a relative frequency change over a time interval between two neighboring etalon peaks measured at two neighboring instances of time.

6. The FMCW-based system of claim 5, wherein to compensate the distortion in the distorted beat signal, the processor is configured to:
   maximize a cost function of a coherent summation of an approximation of a compensated distorted beat signal with parameters of the non-linear frequency signal including the determined coefficients of the basis function, the center frequency, and the time coefficient to produce a time delay estimation of the reflection of the transmitted wave; and
   compensate the distorted beat signal based on the estimated time delay.

7. The FMCW-based system of claim 1, wherein the processor is configured to estimate the coefficients of the basis function by solving a least square problem to minimize the difference.

8. The FMCW-based system of claim 7, wherein the estimated coefficients of the basis function are a function of a polynomial component and peak time instants.

9. The FMCW-based system of claim 1, wherein to compensate for the distortion in the distorted beat signal, the processor is configured to:
   represent the non-linearity of the modulation caused by the impairments as a phase-domain nonlinearity function of the coefficients of the basis function and an unknown phase; and
   compensate the distortion caused by the phase-domain nonlinearity function in a phase domain using a deskew-filtering approach.

10. A method, comprising:
transmitting, by an emitter, at least one wave of radiation to a scene, wherein the transmitted wave is linearly modulated in a frequency domain, and wherein the linear modulation is subject to impairments causing a non-linearity of the transmitted wave in the frequency domain;
receiving, by a receiver, a reflection of the transmitted wave from one or multiple objects in the scene;
interfering, by a mixer, a copy of the transmitted wave with the received reflection of the transmitted wave to generate a beat signal with spectrum peaks corresponding to reflections from the one or multiple objects in the scene, wherein the beat signal is distorted due to the non-linearity of the modulation caused by the impairments;
generating, by an analog-to-digital converter (ADC), samples of the distorted beat signal;
passing, by a frequency filter, signals at predetermined frequencies, wherein the frequency filter is operatively connected to the emitter passing the linearly modulated wave transmitted by the emitter at different time instances at the predetermined frequencies to generate measurements of the modulated wave in a time-domain;
converting the measurements of the linearly modulated wave from the time-domain into a frequency-domain to produce a non-linear frequency signal, wherein the non-linear frequency signal comprises a known linear component representing the desired linear modulation and an unknown non-linear component representing the non-linearity of the modulation;
determining coefficients of a basis function approximating a difference between the non-linear frequency signal and the linear frequency component in the frequency domain; and
detecting one or multiple spectrum peaks in the distorted beat signal with the distortion compensated according to the basis function with the determined coefficients to determine one or multiple distances to the one or multiple objects in the scene.

11. The method of claim 10, wherein a sampling frequency of the measurements of the linearly modulated wave produced by the frequency filter is 1000 times less than a sampling frequency of the ADC.

12. The method of claim 10, wherein the frequency filter includes an etalon producing an etalon signal, such that the samples in the time domain are peaks of the etalon signal at the different time instances making the samples in the time domain sparse.

13. The method of claim 12, wherein the method further comprises:
   converting the etalon peaks into wavelengths based on a function of an index of each of the etalon peaks; and converting the wavelengths into the non-linear frequency signal based on the base wavelength of the etalon and the order of etalon.

14. The method of claim 13, wherein the linear frequency signal is a linear function of time with a constant term of a center frequency at an etalon peak with the largest frequency change over all of the etalon peaks and a time coefficient of a relative frequency change over a time interval between two neighboring etalon peaks measured at two neighboring instances of time.

15. The method of claim 14, wherein for compensating the distortion in the distorted beat signal, the method further comprises:
maximizing a cost function of a coherent summation of an approximation of a compensated distorted beat signal with parameters of the non-linear frequency signal including the determined coefficients of the basis function, the center frequency, and the time coefficient to produce a time delay estimation of the reflection of the transmitted wave; and
compensating the distorted beat signal based on the estimated time delay.

16. The method of claim 10, wherein the method further comprises estimating the coefficients of the basis function by solving a least square problem to minimize the difference.

17. The method of claim 16, wherein the estimated coefficient of the basis function is a function of a polynomial component and peak time instants.

18. The method of claim 10, wherein for compensating the distortion in the distorted beat signal, the method further comprises:
representing the non-linearity of the modulation caused by the impairments as a phase-domain nonlinearity function of the coefficients of the basis function and an unknown phase; and
compensating the distortion caused by the phase-domain nonlinearity function in a phase domain using a deskew-filtering approach.

\* \* \* \* \*